(12) United States Patent
Chen

(10) Patent No.: US 11,975,363 B2
(45) Date of Patent: May 7, 2024

(54) TRANSFER DEVICE, ROBOT, SORTING SYSTEM, AND SORTING METHODS

(71) Applicant: HAI ROBOTICS CO., LTD., Guangdong (CN)

(72) Inventor: Yeguang Chen, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/156,586

(22) Filed: Jan. 19, 2023

(65) Prior Publication Data

US 2023/0149978 A1    May 18, 2023

Related U.S. Application Data

(63) Continuation of application No. PCT/CN2021/103260, filed on Jun. 29, 2021.

(30) Foreign Application Priority Data

Jul. 30, 2020 (CN) .......................... 202010753970.4

(51) Int. Cl.
*B07C 3/08* (2006.01)
*B65G 1/04* (2006.01)

(52) U.S. Cl.
CPC .............. *B07C 3/08* (2013.01); *B65G 1/0435* (2013.01)

(58) Field of Classification Search
CPC ................................ B07C 3/08; B65G 1/0435
See application file for complete search history.

(56) References Cited

U.S. PATENT DOCUMENTS

| 9,073,736 | B1 | 7/2015 | Hussain et al. | |
|---|---|---|---|---|
| 11,850,633 | B2* | 12/2023 | Kalouche | B65G 1/1376 |
| 2016/0236869 | A1 | 8/2016 | Kimura et al. | |
| 2020/0179981 | A1* | 6/2020 | Bellar | B07C 3/006 |
| 2020/0179982 | A1* | 6/2020 | Shah | B07C 3/082 |

FOREIGN PATENT DOCUMENTS

| CN | 102725213 A | 10/2012 |
|---|---|---|
| CN | 208150896 U | 11/2018 |
| CN | 208307644 U | 1/2019 |
| CN | 110239870 A | 9/2019 |

(Continued)

OTHER PUBLICATIONS

International Search Report for PCT/CN2021/103260 mailed Sep. 26, 20221 with English Translation.

(Continued)

*Primary Examiner* — Jacob S. Scott
*Assistant Examiner* — Miraj T. Patel
(74) *Attorney, Agent, or Firm* — Frank Gao, Esq.

(57) ABSTRACT

This application provides a transfer device, a robot, a sorting system, and sorting methods. The transfer device is applied to equipment on which multiple logistics crates are placed in a first direction. There are at least two transfer devices provided in the first direction of the equipment. The transfer device includes a supporting base and a first transmission assembly. The first transmission assembly is located on the supporting base. The first transmission assembly transports a logistics crate. The transfer device provided in this application can improve the work efficiency of the equipment.

19 Claims, 23 Drawing Sheets

(56) References Cited

FOREIGN PATENT DOCUMENTS

| | | |
|---|---|---|
| CN | 110342177 A | 10/2019 |
| CN | 110356752 A | 10/2019 |
| CN | 110589327 A | 12/2019 |
| CN | 110861861 A | 3/2020 |
| CN | 210213640 U | 3/2020 |
| CN | 210213645 U | 3/2020 |
| CN | 110949989 A | 4/2020 |
| CN | 111332664 A | 6/2020 |
| CN | 210883773 U | 6/2020 |
| CN | 211055925 U | 7/2020 |
| CN | 111891615 A | 11/2020 |
| CN | 212711042 U | 3/2021 |
| DE | 4032529 A1 | 4/1992 |
| DE | 102015007861 A1 | 12/2015 |
| JP | H05506288 A | 9/1993 |
| JP | 2727420 B2 | 8/1996 |
| WO | WO2010118412 A1 | 10/2010 |
| WO | WO2018172165 A1 | 9/2018 |
| WO | WO2019185909 A1 | 10/2019 |

OTHER PUBLICATIONS

Book title: Warehousing and distribution management technology; Author: Zhuo Zhao, etc; Published on Aug. 31, 2014; Shenyang Liaoning Science and Technology Press; Related pp. 354-355.

Book title:Logistics facility planning and design training; Author:Pengliang Qiao, etc; Published on Jan. 31, 2018; Hefei University of Technology Press; Related pp. 75-76.

* cited by examiner

TRANSFER DEVICE, ROBOT, SORTING SYSTEM, AND SORTING METHODS

CROSS-REFERENCE TO RELATED APPLICATIONS

This application is a continuation of International Patent Application No. PCT/CN2021/103260 filed on Jun. 29, 2021, which claims priority to Chinese Patent Application No. 202010753970.4 filed on Jul. 30, 2020, which are incorporated herein by reference in their entireties.

TECHNICAL FIELD

This application relates to the field of intelligent storage, and in particular, to a transfer device, a robot, a sorting system, and sorting methods.

BACKGROUND

Intelligent warehousing is an important part of a logistics process. Robots can replace manual labor in moving logistics crates and play an important role in intelligent warehousing.

A robot includes a body, and a control device, a pickup device, and multiple storage racks provided on the body. The control device controls movement of the body. Logistics crates on the storage racks are removed from the body (also called loading) or logistics crates are placed on the storage racks on the body (also called unloading) by the pickup device.

However, during unloading, the robot needs to remove the logistics crates on the storage racks from the body one by one through the pickup device, resulting in low work efficiency of the robot.

SUMMARY

This application provides a transfer device, a robot, a sorting system, and sorting methods, which can improve the work efficiency of a robot.

In a first aspect, this application provides a transfer device, applied to equipment on which multiple logistics crates can be placed in a first direction, where there are at least two transfer devices provided in the first direction of the equipment, the transfer device includes a supporting base and a first transmission assembly, the first transmission assembly is located on the supporting base, and the first transmission assembly is configured to transport a logistics crate.

Optionally, the transfer device provided in this application further includes a first controller and at least one first detection assembly, the first detection assembly is provided on the supporting base, and the first transmission assembly and the first detection assembly are both electrically connected to the first controller; and the first detection assembly is configured to detect whether the logistics crate is at an unsafe position, the first controller is configured to control, in a case that the logistics crate is at an unsafe position, the first transmission assembly to perform transmission in a second direction or a third direction to move the logistics crate to a safe position, and the second direction is opposite to the third direction;

where at the unsafe position, the logistics crate partially extends out of the supporting base, or the logistics crate partially extends out of a detection area formed by the first detection assembly.

Optionally, in the transfer device provided in this application, at least two first detection assemblies are respectively disposed at two ends of the supporting base.

Optionally, in the transfer device provided in this application, the first detection assembly is a reflective photoelectric sensor.

Optionally, in the transfer device provided in this application, the first detection assembly is located on the supporting base, and the detection area formed by the first detection assembly covers at least part of the supporting base.

Optionally, in the transfer device provided in this application, the first detection assembly is a light curtain sensor.

Optionally, in the transfer device provided in this application, the supporting base includes two supports, and the two supports are respectively located on two opposite sides of the first transmission assembly; and each support includes a supporting portion and a blocking edge for blocking the logistics crate, the blocking edge is connected to the supporting portion, the first transmission assembly is fixed to the supporting portion, and the first detection assembly is located on the supporting portion and/or the blocking edge.

Optionally, in the transfer device provided in this application, the first transmission assembly is a conveyor belt assembly or a roller transmission assembly.

Optionally, in the transfer device provided in this application, the first direction is a height direction of the equipment.

In a second aspect, this application provides a robot, including a body and at least two transfer devices provided on the body, where the transfer devices are disposed in a first direction of the body, and each of the transfer devices is the transfer device described above.

Optionally, in the robot provided in this application, the body includes a first mobile chassis and at least two first supporting frames provided on the first mobile chassis, and the first mobile chassis is configured to drive the first supporting frames to move; and the first supporting frames extend upward from the first mobile chassis and are perpendicular to the first mobile chassis, and the transfer devices are connected between two adjacent first supporting frames.

Optionally, in the robot provided in this application, the transfer devices are disposed at intervals in the first direction of the first supporting frames.

In a third aspect, this application provides a sorting system, including at least one conveyor and at least one robot described above, where the conveyor is configured to receive a logistics crate on the robot or transport a logistics crate to the robot.

Optionally, in the sorting system provided in this application, the conveyor includes a second supporting frame and at least two first storage layers, the first storage layer is disposed in a first direction of the second supporting frame, and the first storage layer is configured to receive the logistics crate on the robot or transport the logistics crate to the robot.

Optionally, in the sorting system provided in this application, the first storage layer is movable between a first position and a second position, the first position is on the second supporting frame, and the second position is at a side of the second supporting frame facing away from the robot.

Optionally, in the sorting system provided in this application, a blocking member is provided on the second supporting frame, the blocking member is located at the side of the second supporting frame facing away from the robot, and the blocking member is configured to block at least one of the first storage layers located at an upper part of the second supporting frame.

Optionally, in the sorting system provided in this application, each of the first storage layers is the transfer device described above.

Optionally, in the sorting system provided in this application, the conveyor includes a third supporting frame, a second transmission assembly located on the third supporting frame, and at least one transfer mechanism; and the transfer mechanism is configured to receive the logistics crate, the second transmission assembly is connected to the transfer mechanism, and the second transmission assembly drives the transfer mechanism to rotate around the third supporting frame, so as to deliver the logistics crate to a lower part of the third supporting frame.

Optionally, the sorting system provided in this application further includes at least one unloader, and the unloader is configured to transport the logistics crate between the robot and the conveyor.

Optionally, in the sorting system provided in this application, the unloader includes at least two second storage layers, the second storage layer is disposed in the first direction of the unloader, and the unloader transports the logistics crate between the robot and the conveyor through the second storage layer.

Optionally, in the sorting system provided in this application, each of the second storage layers is the transfer device described above.

Optionally, the sorting system provided in this application further includes at least one elevator, and the elevator is configured to transport the logistics crate between the robot and the conveyor.

Optionally, the sorting system provided in this application further includes at least one elevator, and the elevator is configured to transport the logistics crate between the unloader and the conveyor.

Optionally, in the sorting system provided in this application, the elevator includes a fourth supporting frame and at least one third storage layer, the third storage layer is disposed in the first direction of the fourth supporting frame and is movable in the first direction of the fourth supporting frame, and the third storage layer is configured to transport the logistics crate.

Optionally, in the sorting system provided in this application, the elevator further includes a second mobile chassis, the fourth supporting frame is located on the second mobile chassis, and the second mobile chassis is configured to drive the elevator to move.

Optionally, in the sorting system provided in this application, the elevator further includes a second controller and at least one second detection assembly, the second detection assembly is electrically connected to the second controller, the second detection assembly is configured to detect a distance between the third storage layer and an object at a side of the elevator, and the second controller is configured to control, in a case that the distance is less than or equal to a preset value, the third storage layer to stop moving in the first direction.

Optionally, in the sorting system provided in this application, the number of the elevator is less than or equal to the number of the conveyor.

Optionally, the sorting system provided in this application further includes at least one rack and/or a logistics crate transport assembly, the rack is configured to store the logistics crates on the conveyor, and the logistics crate transport assembly is configured to transport the logistics crates on the conveyor.

Optionally, in the sorting system provided in this application, the number of the unloader is the same as the number of the conveyor.

In a fourth aspect, this application provides a sorting method, using the sorting system described above. The sorting method includes the following steps:
receiving, by the robot, a logistics crate to be sorted;
receiving, by the conveyor, the logistics crate on the robot so as to sort the logistics crate on the conveyor.

Optionally, the sorting method provided in this application further includes:
transporting, by the conveyor, the logistics crate to the robot.

In a fifth aspect, this application provides a sorting method, using the sorting system described above. The sorting method includes the following steps:
receiving, by the robot, a logistics crate to be sorted;
receiving, by the unloader, the logistics crate on the robot, and transporting the logistics crate to the conveyor; and
receiving, by the conveyor, the logistics crate on the unloader so as to sort the logistics crate on the conveyor.

Optionally, the sorting method provided in this application further includes:
transporting, by the conveyor, the logistics crate to the robot through the unloader.

In a sixth aspect, this application provides a sorting method, using the sorting system described above. The sorting method includes the following steps:
receiving, by the robot, a logistics crate to be sorted;
receiving, by the elevator, the logistics crate on the robot, and transporting the logistics crates to the conveyor; and
receiving, by the conveyor, the logistics crate on the elevator so as to sort the logistics crate on the conveyor.

Optionally, the sorting method provided in this application further includes:
transporting, by the conveyor, the logistics crate to the robot through the elevator.

In a seventh aspect, this application provides a sorting method, using the sorting system described above. The sorting method includes the following steps:
receiving, by the robot, a logistics crate to be sorted;
receiving, by the unloader, the logistics crate on the robot, and transporting the logistics crate to the elevator;
receiving, by the elevator, the logistics crate on the unloader, and transporting the logistics crate to the conveyor; and
receiving, by the conveyor, the logistics crate on the unloader so as to sort the logistics crate on the conveyor.

Optionally, the sorting method provided in this application further includes:
transporting, by the conveyor, the logistics crate to the robot sequentially through the elevator and the unloader.

This application provides a transfer device, a robot, a sorting system, and sorting methods. The transfer device is applied to equipment on which multiple logistics crates are placed in a first direction. The transfer device includes a first transmission assembly. The first transmission assembly moves a logistics crate to a rack or a logistics crate transport assembly corresponding to the equipment. Thus, all logistics crates on the equipment can be simultaneously moved to the

DESCRIPTION OF REFERENCE NUMERALS

Figure 1:
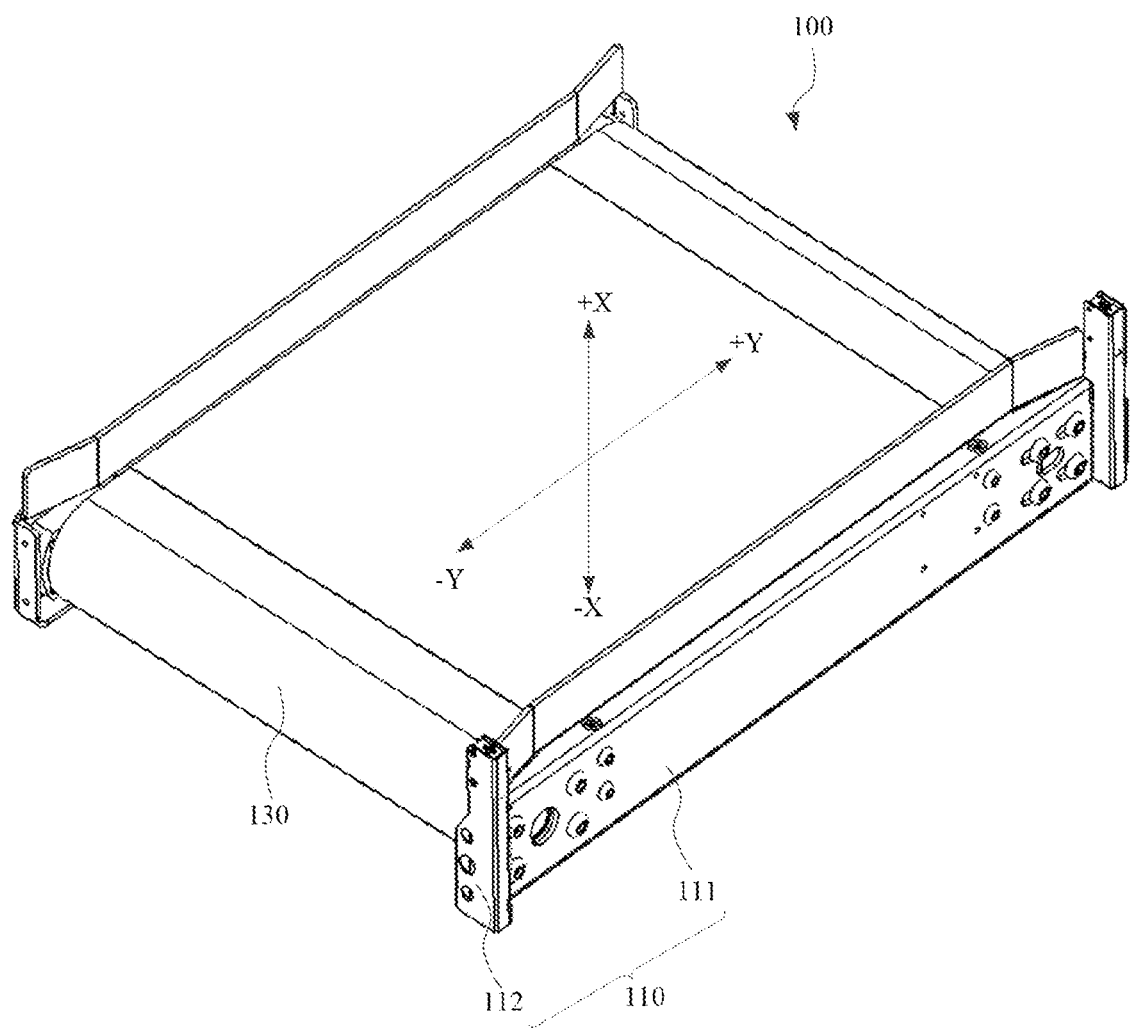
FIG. 1 is a schematic structural diagram of a transfer device according to an embodiment of this application.

100—transfer device; 110—supporting base; 110*a*—first end of supporting base; 110*b*—second end of supporting base; 111, 111*a*, 111*b*—support; 1111—supporting portion; 1112—blocking edge; 1113—bent edge; 1114—second connection portion; 112—mounting member; 1121—mounting portion; 130—first transmission assembly; 131—spindle; 132—conveyor belt; 133—supporting rod; 134—supporting plate; 120, 120*a*, 120*b*—first detection assembly;

200—logistics crate; 200*a*—first end of logistics crate; 200*b*—second end of logistics crate;

300—robot; 310—body; 311—first mobile chassis; 312—first supporting frame; 3121—first connection portion; 313—fork;

400—conveyor; 410—second supporting frame; 411—first storage layer; 412—blocking member; 413—guide rail; 414—gear; 415—rack; 416—third supporting frame; 417—transfer mechanism;

500—unloader; 510—fifth supporting frame; 520—second storage layer;

600—elevator; 610—fourth supporting frame; 620—third storage layer; 630—second mobile chassis; 640—second detection assembly; H—distance;

700—rack.

DETAILED DESCRIPTION

To make the objectives, technical solutions, and advantages of this application clearer, the following describes the technical solutions in the embodiments of this application in more detail with reference to the accompanying drawings in preferred embodiments of this application. In the accompanying drawings, the same or similar components or the components having same or similar functions are denoted by the same or similar reference numerals throughout the description. The described embodiments are only some embodiments rather than all the embodiments of this application. The following embodiments described with reference to the accompanying drawings are exemplary, and are intended to describe this application and cannot be construed as a limitation to this application. All other embodiments obtained by a person of ordinary skill in the art based on the embodiments of this application without creative efforts fall within the scope of protection of this application. The embodiments of this application will be described in detail below with reference to the accompanying drawings.

In the description of this application, unless otherwise explicitly specified and defined, the terms "mounted", "connected", and "connection" are to be understood in a broad sense, for example, the connection may be a fixed connection, an indirect connection through an intermediary, internal communication between two elements, or an interaction relationship between two elements. A person of ordinary skill in the art may understand specific meanings of the terms in this application according to specific situations.

In the description of this application, it is to be understood that, orientations or position relationships indicated by terms such as "up", "down", "front", "rear", "vertical", "horizontal", "top", "bottom", "inner", and "outer" are orientations or position relationships shown based on the accompanying drawings, and are used only for ease of describing this application and simplifying the description, rather than indicating or implying that the device or element has a particular orientation or is constructed and operated in a particular orientation, and therefore, cannot be construed as a limitation to this application.

In the description, claims, and accompanying drawings of this application, the terms "first", "second", and "third" (if present) are intended to distinguish similar objects but do not necessarily indicate a specific order or sequence. It is to be understood that such used data is interchangeable where appropriate so that the embodiments of this application described here can be implemented, for example, in an order other than those illustrated or described here.

Moreover, the terms "include", "have" and any other variants are intended to cover the non-exclusive inclusion, for example, a process, method, system, product, or display that includes a list of steps or units is not necessarily limited to those expressly listed steps or units, but may include other steps or units not expressly listed or inherent to such a process, method, system, product, or display.

Robots can replace manual labor in moving logistics crates and play an important role in intelligent warehousing. A robot includes a body, and a control device, a pickup device, and multiple storage racks provided on the body. The control device controls movement of the body. Logistics crates on the storage racks are removed from the body (also called loading) or logistics crates are placed on the storage racks on the body (also called unloading) by the pickup device. However, during unloading, the robot needs to remove the logistics crates on the storage racks from the body one by one through the pickup device, resulting in low work efficiency of the robot. Thus, embodiments of this application provide a transfer device, a robot, a sorting system, and sorting methods, which can improve the work efficiency of a robot.

This application will be described in detail below with reference to the accompanying drawings and specific embodiments.

Embodiment 1

Figure 2:
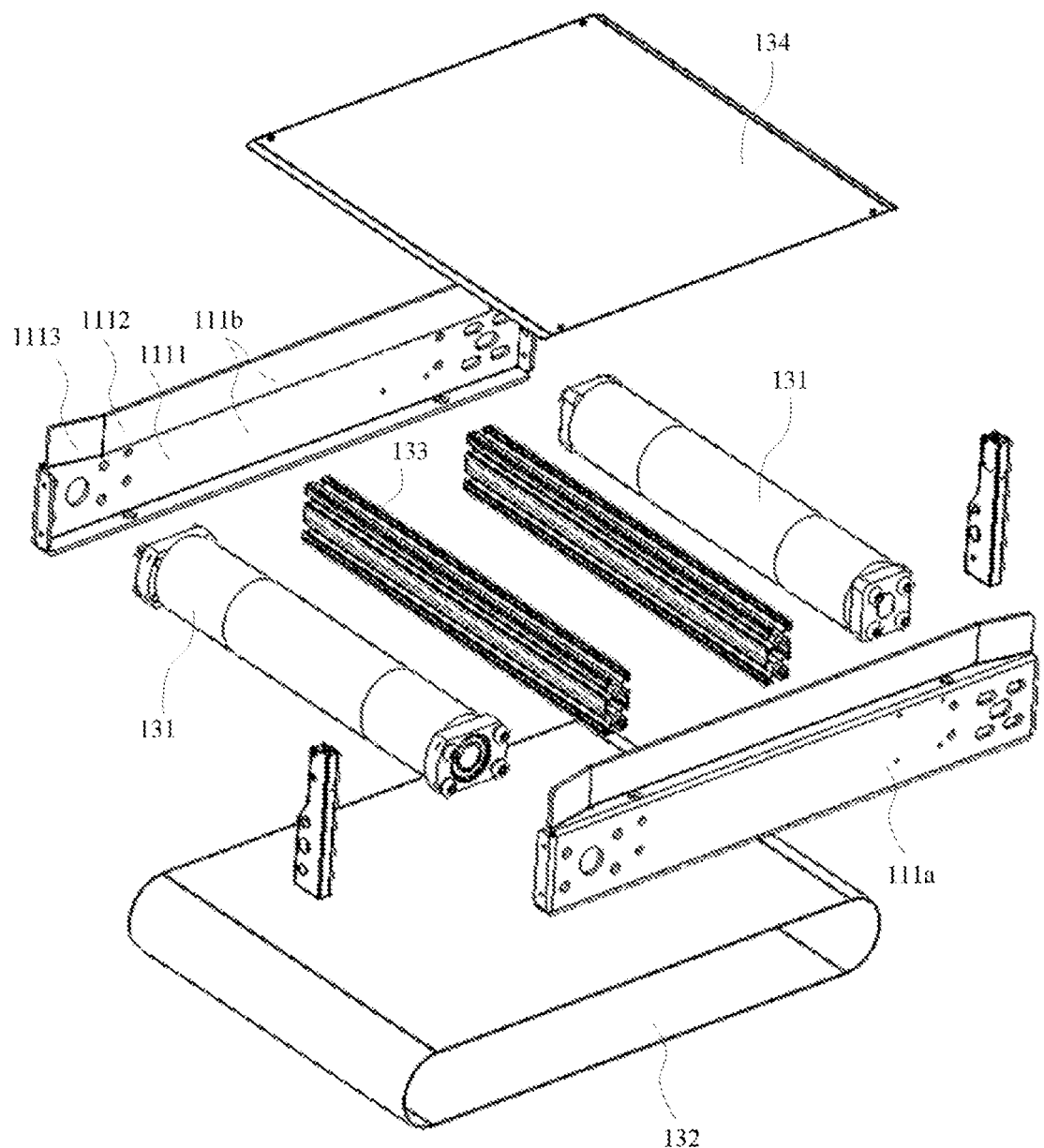
FIG. 2 is an exploded view of a transfer device according to an embodiment of this application.
Figure 3:
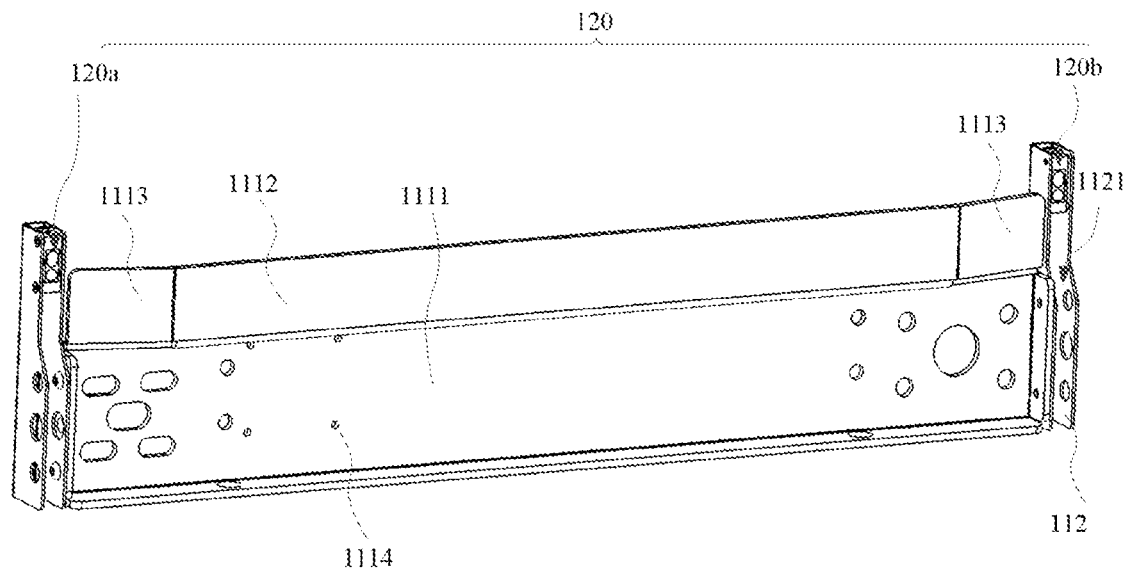
FIG. 3 is a schematic structural diagram of a support and a detection assembly in a transfer device according to an embodiment of this application.
Figure 4:
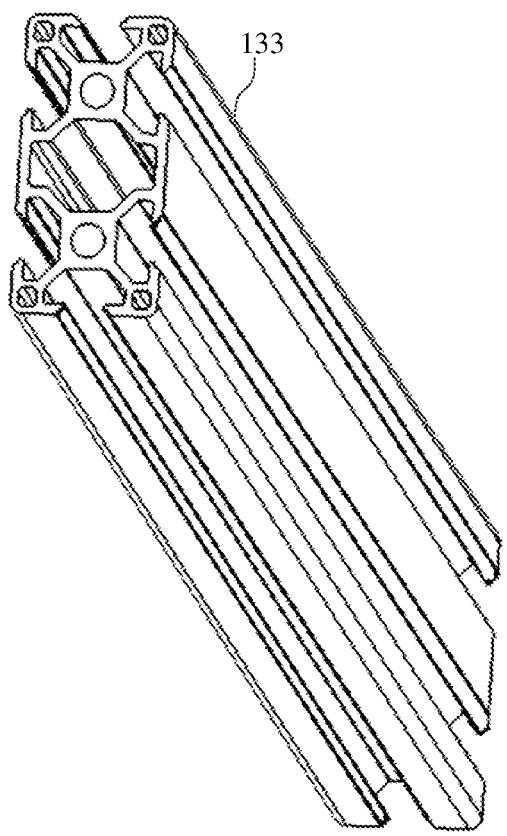
FIG. 4 is a schematic structural diagram of a supporting rod in a transfer device according to an embodiment of this application.
Figure 5:
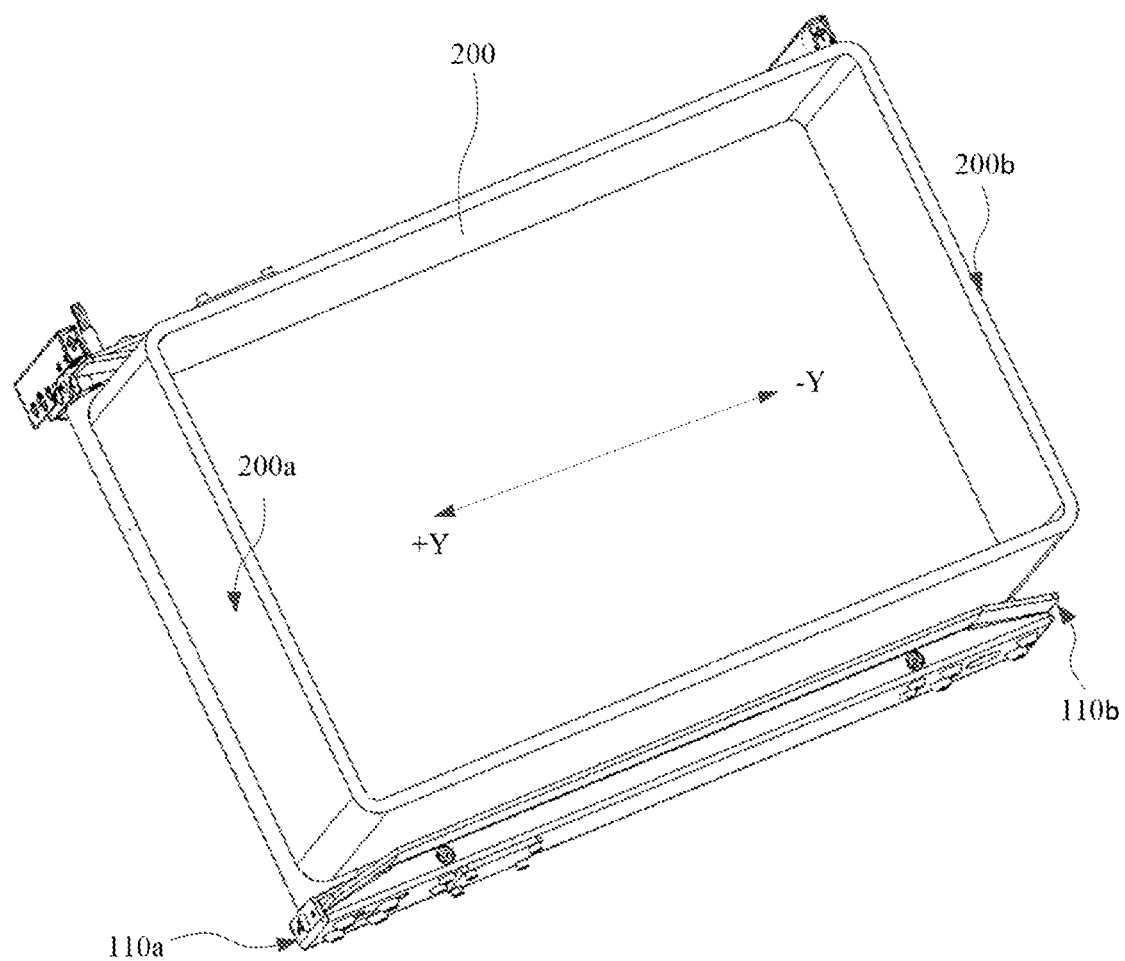
FIG. 5 is a use state diagram of a transfer device according to an embodiment of this application.

FIG. 1 is a schematic structural diagram of a transfer device according to an embodiment of this application. FIG. 2 is an exploded view of a transfer device according to an embodiment of this application. FIG. 3 is a schematic structural diagram of a support and detection assemblies in a transfer device according to an embodiment of this application. FIG. 4 is a schematic structural diagram of a supporting rod in a transfer device according to an embodiment of this application. FIG. 5 is a use state diagram of a transfer device according to an embodiment of this application.

Figure 6:
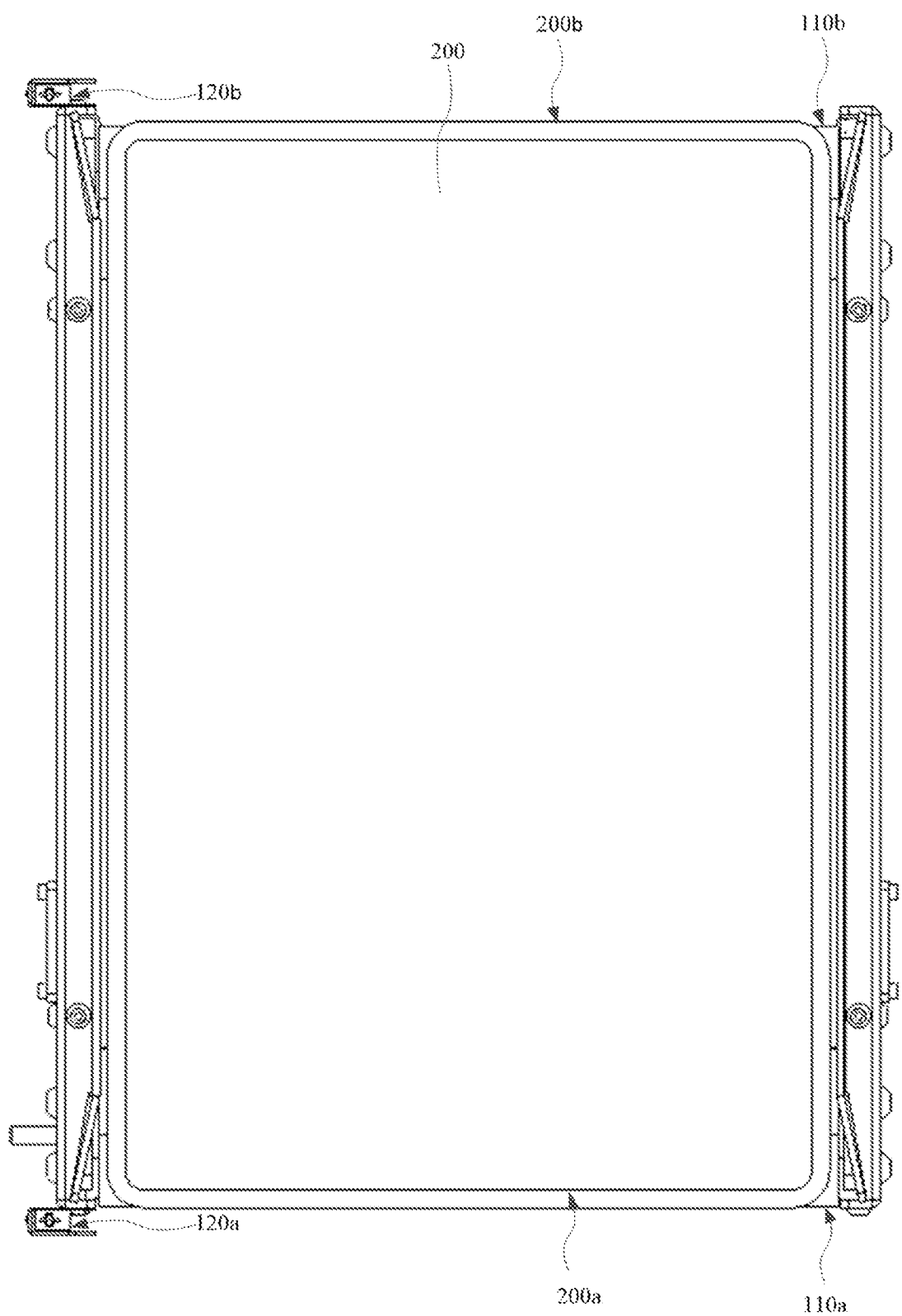
FIG. 6 is a top view of FIG. 5.
Figure 7:
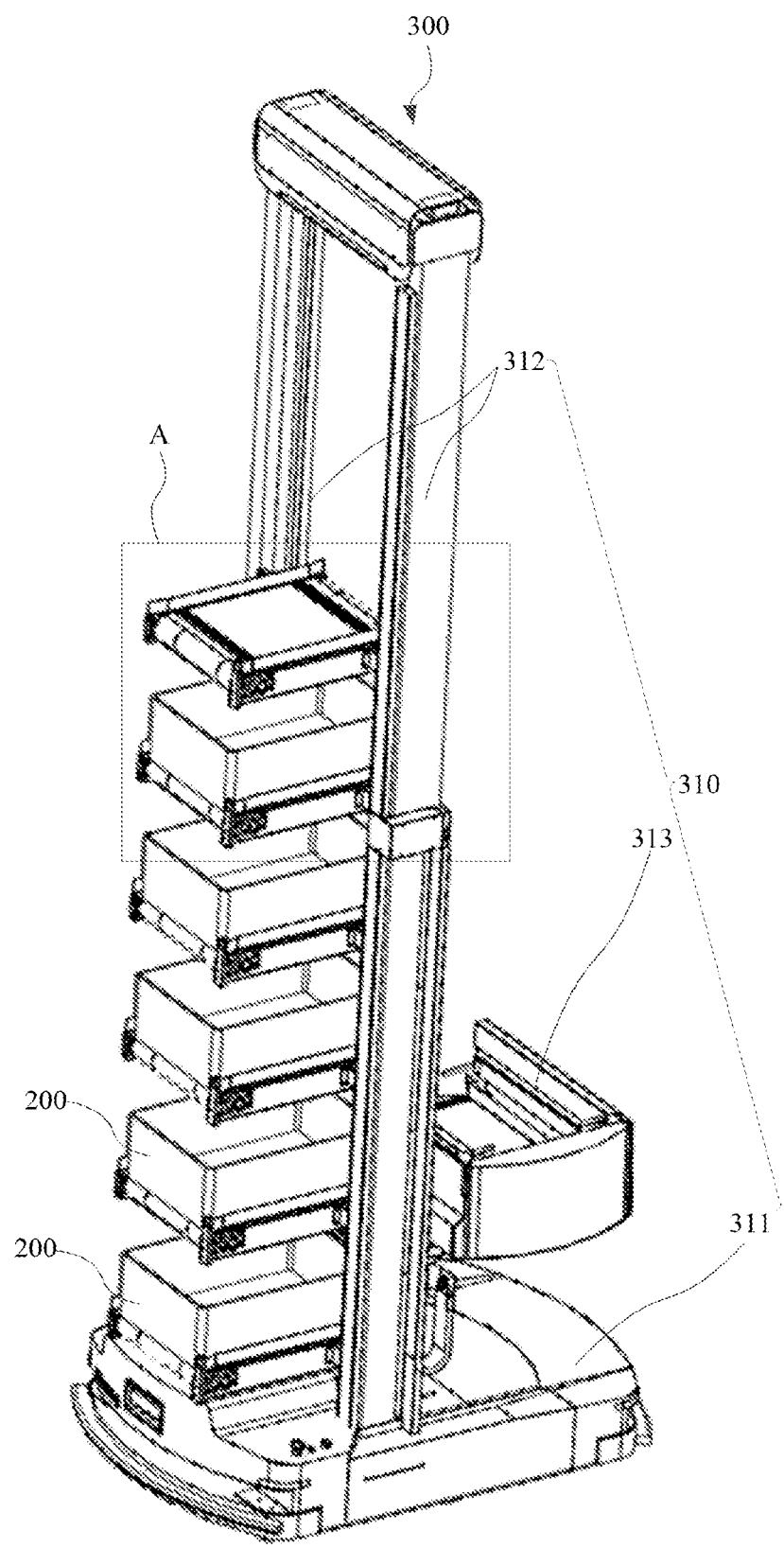
FIG. 7 is a schematic structural diagram of a robot according to an embodiment of this application.
Figure 8:
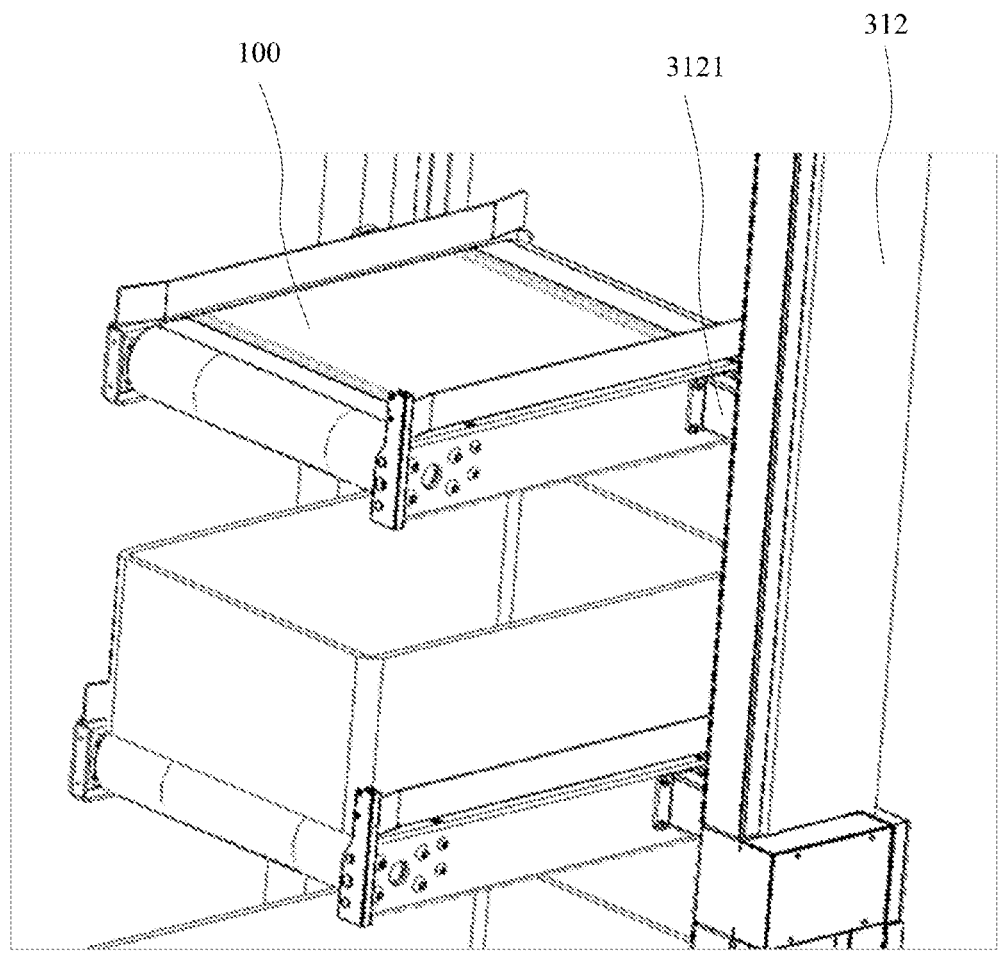
FIG. 8 is a partial enlarged view of part A in FIG. 7.

FIG. 6 is a top view of FIG. 5. FIG. 7 is a schematic structural diagram of a robot according to an embodiment of this application. FIG. 8 is a partial enlarged view of part A in FIG. 7. With reference to FIG. 1 to FIG. 8, this application provides a transfer device 100, applied to equipment on which multiple logistics crates 200 can be placed in a first direction. There are at least two transfer devices 100 provided in the first direction of the equipment. The first direction may be a height direction of the equipment.

The transfer device 100 includes a supporting base 110 and a first transmission assembly 130. The first transmission assembly 130 is located on the supporting base 110. The first transmission assembly 130 transports a logistics crate 200.

In this application, the equipment on which multiple logistics crates 200 can be placed in the first direction may be equipment used in the art for transporting logistics crates, such as a robot 300, an unloader 500, or a conveyor 400. For the convenience of depiction, the description in this application is given by providing at least two transfer devices 100 on the robot 300 in the first direction, that is, the robot 300 can be provided with at least two transfer devices 100 in the height direction. A logistics crate 200 can be placed on each of the transfer devices 100.

The sizes and packaging of goods are different. In order to facilitate transportation of goods, the goods can be placed in a logistics crate 200, and the logistics crate 200 is placed on the first transmission assembly 130 to transport the logistics crate 200. One or more logistics crates 200 can be placed on the first transmission assembly 130. When the goods have outer packaging and the size thereof is close to or equal to the size of the logistics crate 200, the goods can be directly placed on the first transmission assembly 130 for transportation.

The first transmission assembly 130 is configured to transport the logistics crate 200. When the robot 300 loads goods, the logistics crates 200 are placed one by one into the multiple transfer devices 100 provided on the robot 300 through a pickup device such as a fork 313 on the robot 300. At least one logistics crate 200 can be placed in each of the transfer devices 100, and at least one piece of goods can be placed in one logistics crate 200. This can be selected according to actual situations, and is not limited in this application.

When the robot 300 unloads goods, the robot 300 moves to a position where the goods need to be unloaded, for example, the robot 300 moves to a rack or the conveyor 400. The rack or the conveyor 400 is provided with a storage layer opposite to the transfer device 100. The first transmission assembly 130 synchronously perform transmission in the +Y direction or the −Y direction in FIG. 1 to move the logistics crate 200 to the storage layer opposite thereto, so that all the logistics crates 200 on the robot 300 can be simultaneously moved to the storage layers at a same time, thereby improving the unloading speed of the robot 300, reducing the unloading time of the robot 300, and improving the work efficiency of the robot 300. The logistics crates 200 on the storage layers can also be simultaneously returned to the transfer devices 100 on the robot 300, thereby improving the loading efficiency of the robot 300.

With continuing reference to FIG. 1 to FIG. 6, the transfer device 100 further includes a first controller (not shown) and at least one first detection assembly 120, the first detection assembly 120 is provided on the supporting base 110, and the first transmission assembly 130 and the first detection assembly 120 are both electrically connected to the first controller. The first detection assembly 120 is configured to detect whether the logistics crate 200 is at an unsafe position. The first controller is configured to control, in a case that the logistics crate 200 is at an unsafe position, the first transmission assembly 130 to perform transmission in a second direction or a third direction to move the logistics crate 200 to a safe position. The second direction is opposite to the third direction. For convenience of depiction, the second direction may be the +Y direction in FIG. 1, and the third direction may be the −Y direction in FIG. 1.

At the unsafe position, the logistics crate 200 partially extends out of the supporting base 110, or the logistics crate 200 partially extends out of a detection area formed by the first detection assembly 120.

Specifically, the supporting base 110 is used for supporting the first transmission assembly 130, and the length of the supporting base 110 in the second direction is equal to the length of the first transmission assembly 130 in the second direction, or the difference between the length of the supporting base 110 in the second direction and the length of the first transmission assembly 130 in the second direction is less than or equal to 50 mm, thereby making it convenient for the first detection assembly 120 to detect whether the logistics crate 200 is located at an unsafe position. The first controller may be provided on the supporting base 110. Thus, it is convenient to electrically connect the first transmission assembly 130 to the first controller, and to mount the first controller. In some embodiments, the first controller may also be disposed on another position of the robot 300. The position of the first controller is not limited in this application.

During the process that the robot 300 moves to a position where goods need to be unloaded, or during other movements, the logistics crate 200 may move on the first transmission assembly 130 due to vibration and other reasons, and thus is at a risk of falling from the transfer device 100. Therefore, in this application, the transfer device 100 further includes a first controller and at least one first detection assembly 120. The first detection assembly 120 detects whether the logistics crate 200 is at an unsafe position. In a case that the first detection assembly 120 detects that the logistics crate 200 is at an unsafe position, the first controller controls the first transmission assembly 130 to perform transmission in the +Y direction or −Y direction in FIG. 1 to move the logistics crate 200 to a safe position. Thus, the logistics crate 200 is prevented from falling from the transfer device 100 during movement of the robot 300.

In some embodiments, the number of the first detection assembly 120 is at least two, and the at least two first detection assemblies 120 are respectively disposed on two ends of the supporting base 110. When a first end 200a of the logistics crate moves to a first end 110a of the supporting base, the logistics crate 200 tends to extend out of the supporting base 110, and the first of the first detection assemblies 120a can detect the logistics crate 200. In this case, the first controller may control the first transmission assembly 130 to perform transmission in the −Y direction, so as to move the logistics crate 200 toward a second end 110b of the supporting base, thereby moving the logistics crate 200 into the supporting base 110. When a second end 200b of the logistics crate moves to the second end 110b of the supporting base, the second of the first detection assemblies 120b can detect the logistics crate 200. In this case, the first controller may control the first transmission assembly 130 to perform transmission in the +Y direction, so as to move the logistics crate 200 toward the first end 110a of the supporting base, thereby moving the logistics crate 200 into the supporting base 110. Thus, the logistics crate 200 can be prevented from falling from the transfer device 100.

The first detection assembly 120 may be a reflective photoelectric sensor. The reflective photoelectric sensor is not affected by the shape, color, and material of an object to be detected, and is easy to mount.

The detection timing for the first detection assembly 120 to detect whether the logistics crate 200 is located at an unsafe position may be during a process that the robot 300 moves to a position where goods needs to be unloaded, or during other movements. When the robot 300 is in a stationary state or in the process of transporting the logistics crate 200, the first detection assembly 120 may stop detection operation.

In another embodiment, the number of the first detection assembly 120 may be one, the first detection assembly 120 may be located on the supporting base 110, and a detection area formed by the first detection assembly 120 covers at least part of the supporting base 110. The first detection assembly 120 may be a light curtain sensor. The detection area formed by the light curtain sensor matches the logistics crate 200. When the logistics crate 200 partially extends out of the detection area formed by the first detection assembly 120, the first controller may control the first transmission assembly 130 to perform transmission in the −Y direction or the +Y direction, so as to make the logistics crate 200 located in the detection area formed by the detection assembly 120. Thus, the logistics crate 200 can be prevented from falling from the transfer device 100.

With continuing reference to FIG. 1 to FIG. 3, in the transfer device provided in this application, the supporting base 110 includes two supports 111, and the two supports 111 are respectively located on two opposite sides of the first transmission assembly 130.

Each support 111 includes a supporting portion 1111 and a blocking edge 1112 for blocking the logistics crate 200. The blocking edge 1112 is connected to the supporting portion 1111, and the blocking edge 1112 is located above the supporting portion 1111. The first transmission assembly 130 is fixed to the supporting portion 1111. The first detection assembly 120 is located on the supporting portion 1111 and/or the blocking edge 1112.

In the transfer device provided in this application, the first transmission assembly 130 is a conveyor belt assembly or a roller transmission assembly. The conveyor belt assembly may include a motor (not shown), two spindles 131, and a conveyor belt 132 sleeved on the spindles 131. The logistics crate 200 is located on the conveyor belt 132. The two ends of each spindle 131 are respectively rotatably connected to the two supporting portions 1111. There may be one motor, and the motor is connected to any of the spindles 131. The spindle 131 is driven to rotate forwardly or backwardly by the motor, so as to drive the logistics crate 200 on the conveyor belt 132 to move in the +Y direction or the −Y direction in FIG. 5. Alternatively, the two spindles 131 are each connected to a motor, one motor drives the spindle 131 connected thereto to forwardly rotate, and the other motor drives the spindle 131 connected thereto to backwardly rotate, so as to drive the logistics crate 200 on the conveyor belt 132 to move.

If the logistics crate 200 is heavy and the conveyor belt 132 cannot support the logistics crate 200, the logistics crate 200 on the conveyor belt 132 may be caused to move at a reduced speed or be difficult to move smoothly. Therefore, in some embodiments, supporting rods 133 are connected between the two supports 111, the supporting rods 133 are located in an area enclosed by the conveyor belt 132, and the conveyor belt 132 is supported by the supporting rods 133. In order to increase the supporting area, a supporting plate 134 can be connected onto the supporting rods 133, and the conveyor belt 132 is supported by the supporting plate 134.

In this application, an anti-skid layer may be provided on the conveyor belt 132, and the anti-skid layer can increase the static friction between the logistics crate 200 and the surface of the conveyor belt 132 to prevent the logistics crate 200 from sliding on the conveyor belt 132. The anti-skid layer may be an anti-skid pattern provided on the surface of the conveyor belt 132 (the contact surface between the conveyor belt 132 and the logistics crate 200), or an uneven structure provided on the surface of the conveyor belt 132, or an anti-skid layer well known to a person skilled in the art, which is not limited in this embodiment.

In some embodiments, the first transmission assembly 130 may be a roller transmission assembly. The roller transmission assembly may include at least one driving member and multiple spindles 131. Two ends of each spindle 131 are respectively rotatably connected to the two supporting portions 1111, and at least one spindle 131 is connected to the driving member. The logistics crate 200 is placed on the spindles 131, and the spindles 131 are driven to rotate by the driving member, so as to move the logistics crate 200 in the +Y direction or the −Y direction. An anti-skid sleeve can be provided on each spindle 131. The static friction between the logistics crate 200 and the surfaces of the spindles 131 is increased through the anti-skid sleeves to prevent the logistics crate 200 from sliding on the spindles 131.

In order to facilitate mounting of the first detection assembly 120, in the transfer device provided in this application, the supporting base 110 further includes at least two mounting members 112. The at least two mounting members 112 are respectively connected to two opposite ends of the supporting base 110. Each mounting member 112 is provided with a mounting portion 1121, and the first detection assembly 120 is located on the mounting portion 1121.

Two ends of at least one support 111 are each connected to a mounting member 112; or two ends of one of the two supports 111 are each connected to a mounting member 112; or, a first end of one support 111a is connected to a mounting member 112, and a second end of the other support 111b is connected to a mounting member 112; or, a second end of the support 111a is connected to a mounting member 112, and a first end of the other support 111b is connected to a mounting member 112. As long as it is ensured that the at least two first detection assemblies 120 are respectively disposed at the two ends of the supporting base 110.

The logistics crate 200 is moved on the first transmission assembly 130. In order to avoid collision between the logistics crate 200 and the first detection assembly 120, in a specific implementation, the mounting portion 1121 is an accommodating groove, the first detection assembly 120 is accommodated in the accommodating groove, and a detection end of the first detection assembly 120 faces the first transmission assembly 130.

Exemplarily, a sensing surface of the reflective photoelectric sensor faces the first transmission assembly 130. The first detection assembly 120 may also be a travel switch. The travel switch may be located on the first transmission assembly 130 or on the mounting portion 1121, as long as the travel switch can detect movement of the logistics crate 200 relative to the first transmission assembly 130 when the first transmission assembly 130 is in a stationary state. No limitation is made thereto in this embodiment.

Further, in the transfer device provided in this application, two ends of the blocking edge 1112 are provided with bent edges facing away from the first transmission assembly 130, so as to increase the opening size of the exit and the entry of the transfer device 100, thereby achieving a guiding function for the logistics crate 200 to enter the first transmission assembly 130 and exit the first transmission assembly 130.

The mounting portion 1121 is flush with the inner side of a corresponding bent edge 1113 or is located outside the corresponding bent edge 1113. In this way, collision between the logistics crate 200 and the first detection assembly 120 can be avoided. The height of the bent edge 1113 (the +X direction in FIG. 1) may be greater or less than the height of the mounting portion 1121 (the +X direction in FIG. 1), as long as the first detection assembly 120 is higher than the bent edge 1113.

Embodiment 2

With continuing reference to FIG. 1 to FIG. 8, this application further provides a robot 300, including a body 310 and at least one transfer device 100 provided on the body 310. The transfer device 100 is the transfer device 100 according to any one of the foregoing embodiments.

The structure of the transfer device 100 is described in detail in the above embodiments, and no repeated description is provided herein.

A pickup device may also be provided on the robot 300, and the pickup device is configured to move the logistics crate 200 to the transfer device 100. The pickup device may be a pickup device commonly used in the art, such as a robotic arm, a clamping fork, or a claw, which is not limited in this application. In FIG. 7 of this embodiment, a fork 313 is taken as the pickup device for description.

In order to facilitate movement of the robot 300, during specific implementation, the body 310 includes a first mobile chassis 311 and at least two first supporting frames 312 provided on the first mobile chassis 311, and the first mobile chassis 311 is configured to drive the first supporting frames 312 to move.

The first supporting frames 312 extend upward from the first mobile chassis 311 and are perpendicular to the first mobile chassis 311, and the transfer devices 100 are connected between two adjacent first supporting frames 312.

The transfer devices 100 are disposed at intervals in a first direction of the first supporting frames 312 (i.e., the height direction of the first supporting frames 312). The distance between two adjacent transfer devices 100 may be the same or different. For example, the distance between two adjacent transfer devices 100 increases or decreases sequentially in the height direction of the first mobile chassis 311. Thus, logistics crates 200 of different specifications can be placed.

In some embodiments, the mounting positions of the transfer devices 100 are adjustable, so that the distances between the transfer devices 100 can be adjusted according to the specifications of the logistics crates 200. For example, multiple first through holes are provided at intervals in the height direction of each first supporting frame 312, and the transfer devices 100 are connected to the through holes by bolts to adjust the distances between the transfer devices 100.

In order to facilitate mounting of the transfer device 100 on the body 310, in the robot provided in this application, each first supporting frame 312 is provided with at least one first connection portion 3121 in the first direction, the supporting base 110 is provided with a second connection portion 1114, the transfer device 100 and the first supporting frame 312 are detachably connected through the first connection portion 3121 and the second connection portion 1114.

In a specific implementation, one of the first connection portion 3121 and the second connection portion 1114 is first connection holes, and the other is a connection seat. The connection seat is provided with second through holes, and screws are connected to the first connection holes through the second through holes on the connection seat, so as to detachably connect the transfer device 100 to the first supporting frame 312. Alternatively, the first connection portion 3121 is snap-fit to the second connection portion 1114. One of the first connection portion 3121 and the second connection portion 1114 is a slot, and the other is a fastener matching the slot. Alternatively, the transfer devices 100 are connected to the first supporting frames 312 in a detachable connection manner well known to a person skilled in the art to adjust the distances between the transfer devices 100. No limitation thereto is made herein.

The second connection portion 1114 may be located on the supporting portion 1111, and the supporting portion 1111 is a main load-bearing portion of the supporting base 110. Thus, the reliability of the connection between the transfer devices 100 and the body 310 is increased.

Embodiment 3

Figure 9:
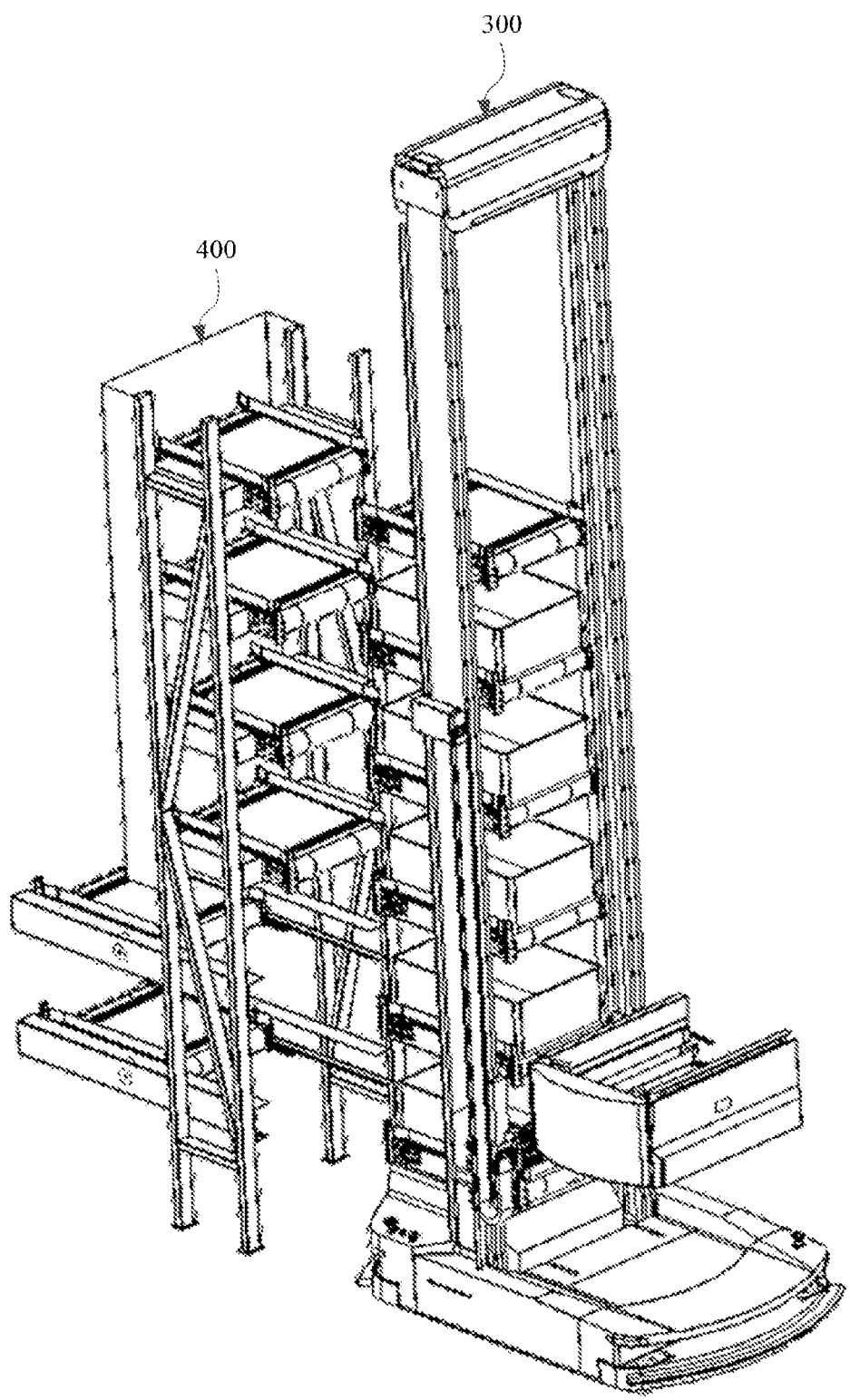
FIG. 9 is a first schematic structural diagram of a sorting system according to an embodiment of this application.

FIG. 9 is a first schematic structural diagram of a sorting system according to an embodiment of this application. With reference to FIG. 1 to FIG. 9, the sorting system provided in this application includes at least one conveyor 400 and at least one robot 300 according to any one of the foregoing embodiments. The conveyor 400 is configured to receive a logistics crate 200 on the robot 300, or to transport a logistics crate 200 on the conveyor 400 to the robot 300.

The structure of the robot 300 is described in detail in the above embodiments, and no repeated description is provided herein.

Possible implementation structures of the conveyor 400 will be described below through different embodiments.

Figure 10:
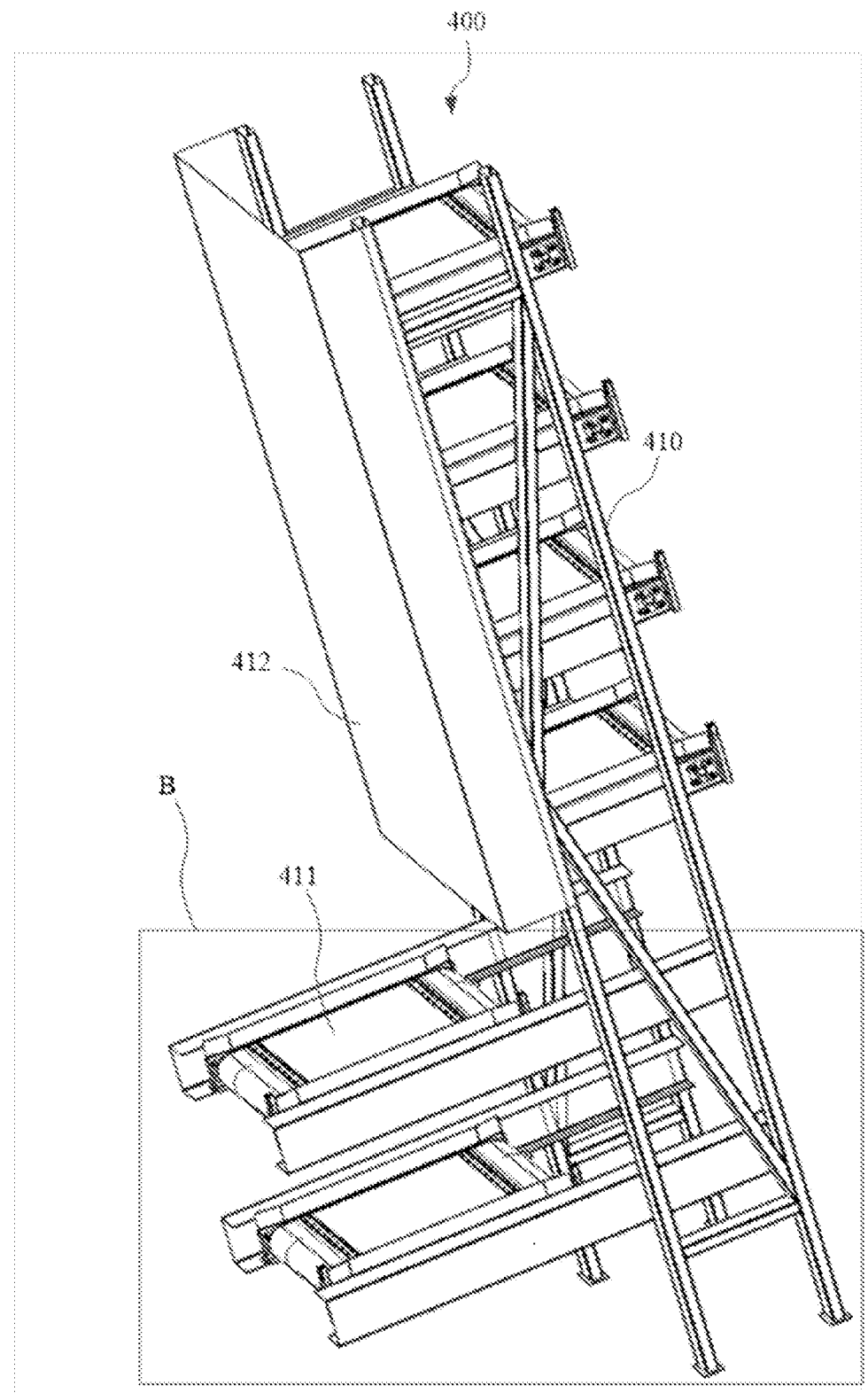
FIG. 10 is a first schematic structural diagram of a conveyor in a sorting system according to an embodiment of this application.
Figure 11:
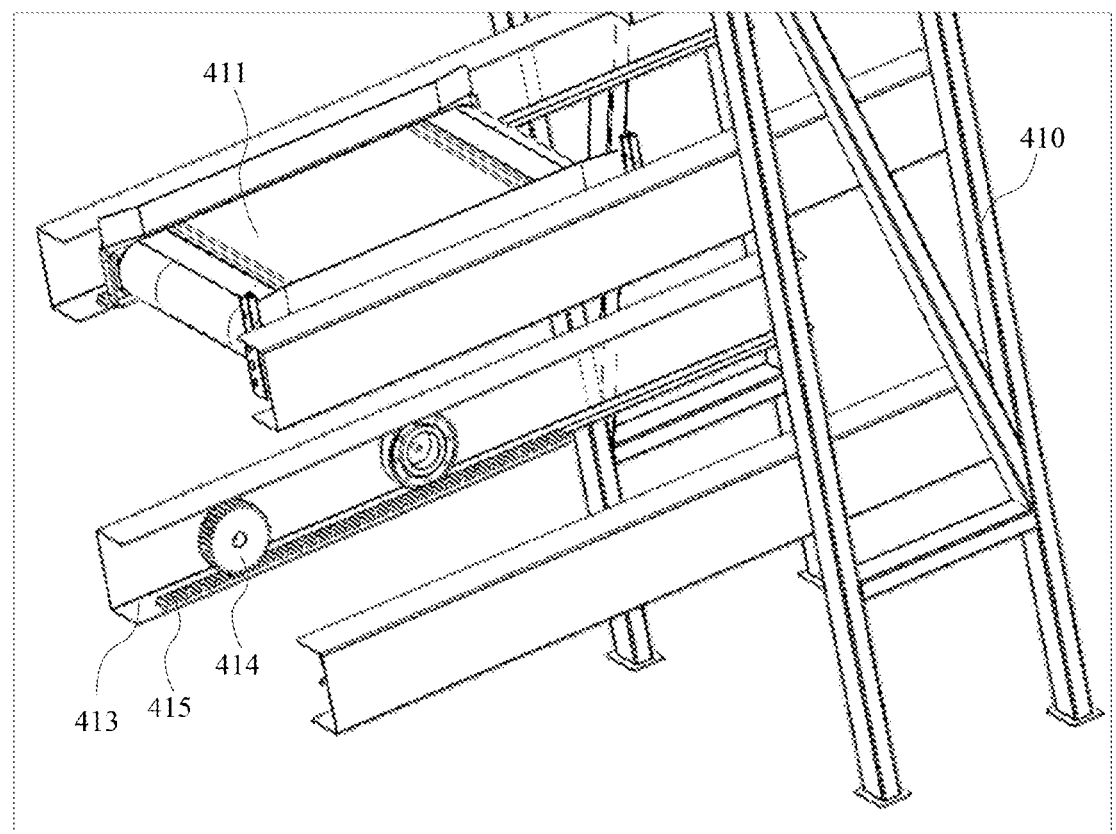
FIG. 11 is a schematic diagram of the internal structure of part B in FIG. 10.

FIG. 10 is a first schematic structural diagram of a conveyor in a sorting system according to an embodiment of this application. FIG. 11 is a schematic diagram of the internal structure of part B in FIG. 10. With reference to FIG. 10 and FIG. 11, in the sorting system provided in this application, the conveyor 400 includes a second supporting frame 410 and at least two first storage layers 411 located on the second supporting frame 410. The first storage layer 411 is disposed in a first direction of the second supporting frame 410 (i.e., the height direction of the second supporting frame 410), and the first storage layer 411 is configured to receive a logistics crate 200 on the robot 300 or transport a logistics crate 200 to the robot 300. The second supporting frame 410 may be a cuboid frame, and the first storage layers 411 are located in the second supporting frame 410.

Optionally, the first storage layer 411 is provided in one-to-one correspondence to the transfer device 100 on the robot 300. When the robot 300 moves to the conveyor 400, the transfer device 100 on the robot 300 simultaneously move the logistics crate 200 to the first storage layer 411 opposite thereto through transmission by the first transmission assembly 130, and an operator sorts the logistics crate 200 on the first storage layer 411 of the conveyor 400. In this way, direct contact between the operator and the robot 300 is avoided, the unloading speed of the robot 300 is increased, the unloading time of the robot 300 is reduced, and the work efficiency of the robot 300 is improved.

In order to facilitate sorting of goods in the logistics crate 200 by the operator, in the sorting system provided in this application, each first storage layer 411 can be moved between a first position and a second position. The first position is on the second supporting frame 410, and the second position is at the side of the second supporting frame 410 facing away from the robot 300. That is, the first storage layer 411 can move toward the side facing away from the robot 300 to the outside of the second supporting frame 410. In this way, the operator can directly perform an operation of sorting the goods in the logistics crate 200 moving along with the first storage layer 411 to the outside of the second supporting frame 410. It is convenient for the operator to sort the goods in the logistics crate 200.

In some embodiments, one or two first storage layers 411 in the lower part of the second supporting frame 410 can be moved between the first position and the second position. In this way, the operator can stand to sort the goods at a comfortable height that can be reached, without squatting or climbing, thereby increasing comfort of the operator during work.

In this application, the heights of some first storage layers 411 located at the upper part of the second supporting frame 410 may exceed the height of the operator, which is inconvenient for the operator to sort the goods. Therefore, the some first storage layers 411 can be used as temporary logistics crate placement positions for temporarily placing the logistics crates 200. When sorting of goods in the logistics crate 200 on the first storage layer 411 at the lower part of the second supporting frame 410 is completed, the logistics crates 200 at the temporary logistics crate storage positions can be moved to the first storage layer 411 at the lower part of the second supporting frame 410.

In some embodiments, a blocking member 412 is provided on the second supporting frame 410, the blocking member 412 is located at the side of the second supporting frame 410 facing away from the robot 300, and the blocking member 412 is configured to block at least one first storage layer 411 located at the upper part of the second supporting frame 410. By using the blocking member 412 to block at least one first storage layer 411 located at the upper part of the second supporting frame 410, the logistics crate 200 on the first storage layer 411 at the upper part of the second supporting frame 410 is prevented from falling to the operator side, thereby increasing the safety of the operator during work.

The boundary between the upper part of the second supporting frame 410 and the lower part of the second supporting frame 410 can be configured according to the comfortable height for the operator to work. When the operator needs to use an auxiliary tool such as a step stool or a ladder to sort the logistics crate 200 in a first storage layer 411, the second supporting frame 410 at the height and above can be defined as the upper part of the second supporting frame 410.

In order to make it convenient for the first storage layer 411 to extend out of the second supporting frame 410, in one embodiment, a guide rail 413 is provided on the second supporting frame 410, and the guide rail 413 may extend toward the outside of the second supporting frame 410. Two guide rails 413 may be provided horizontally, and the first storage layer 411 is connected between the two guide rails 413. The guide rail 413 having a guiding function for movement of the first storage layer 411, so that the first storage layer 411 can smoothly extend out of the second supporting frame 410.

Implementations in which the first storage layer 411 extends out of the second supporting frame 410 will be described below.

In a possible implementation, the first storage layer 411 is slidably connected to the guide rail 413 and slides in the extension direction of the guide rail 413. For example, the guide rail 413 is provided with a groove, the first storage layer 411 is provided with a protrusion, and the protrusion is inserted into the groove to slidably connect the first storage layer 411 to the guide rail 413. Alternatively, a slidable connection manner well known to a person skilled in the art may be used.

In another possible implementation, a driving structure is provided on the second supporting frame 410, and the driving structure is connected to the first storage layer 411 to drive the first storage layer 411 to extend out of the second supporting frame 410. Specifically, the driving structure may include a motor, a gear 414, and a rack 415 meshed with the gear 414. The rack 415 is located on the guide rail 413. The motor drives the gear 414 to rotate forwardly or backwardly, so as to drive the gear 414 to move along the rack 415, and then drive the first storage layer 411 connected to the rack 415 to extend out of the second supporting frame 410 or retreat into the second supporting frame 410.

Implementations in which the first storage layer 411 extends out of the second supporting frame 410 are not limited to the above two. In a specific implementation, the above two manners can be combined so that the first storage layer 411 can extend out of the second supporting frame 410. Alternatively, the structure of a slidable drawer in the related art can be used so that the first storage layer 411 can extend out of the second supporting frame 410. No limitation thereto is made in this embodiment.

In some embodiments, the first storage layer 411 is the transfer device 100 provided in the foregoing embodiments.

Figure 12:
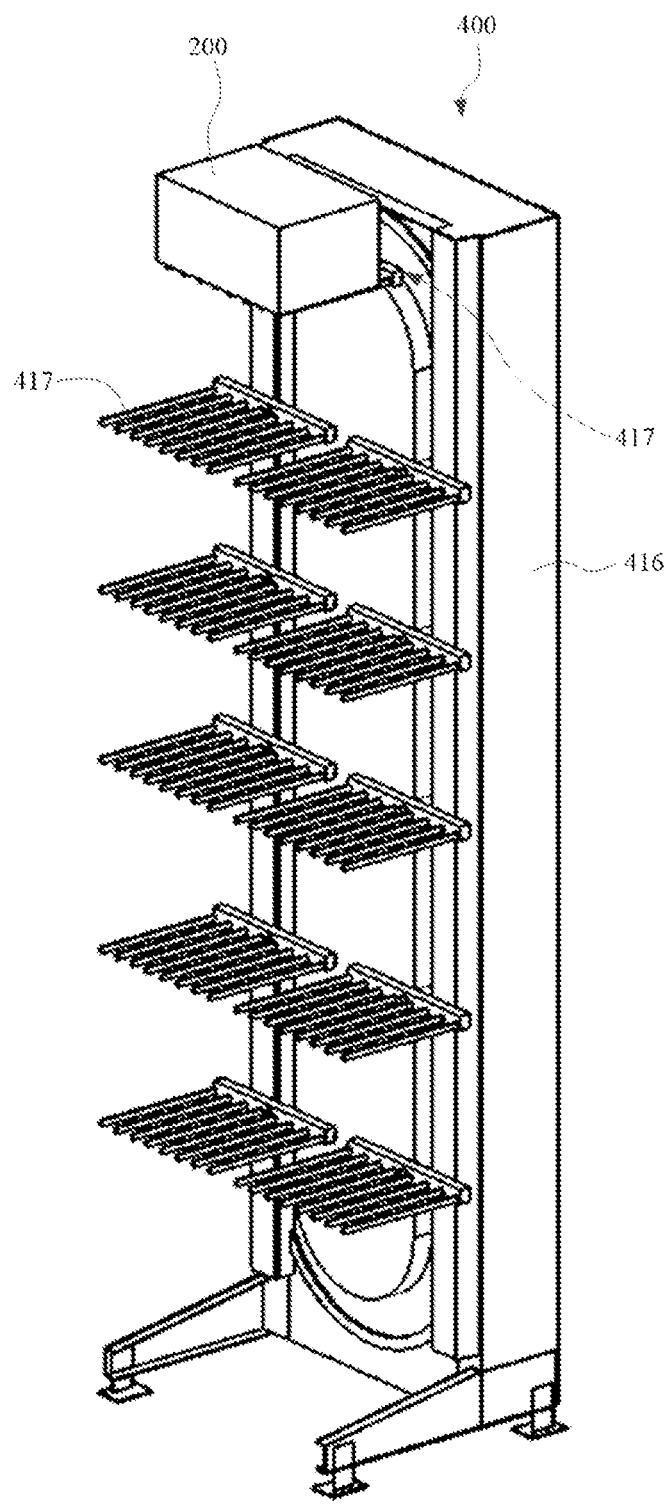
FIG. 12 is a second schematic structural diagram of a conveyor in a sorting system according to an embodiment of this application.

FIG. 12 is a second schematic structural diagram of a conveyor in a sorting system according to an embodiment of this application. With reference to FIG. 12, in the sorting system provided in this application, the conveyor 400 includes a third supporting frame 416, a second transmission assembly (not shown), and at least one transfer mechanism 417.

The transfer mechanism 417 is configured to receive a logistics crate 200, the second transmission assembly is connected to the transfer mechanism 417, and the second transmission assembly drives the transfer mechanism 417 to rotate around the third supporting frame 416, so as to deliver the logistics crate 200 to a lower part of the third supporting frame 416.

The division mode of the upper part of the third supporting frame 416 and the lower part of the third supporting frame 416 is the same as the division mode of the upper part of the second supporting frame 410 and the lower part of the second supporting frame 410 in the foregoing embodiments. Reference may be made to the division mode of the upper part of the second supporting frame 410 and the lower part of the second supporting frame 410 described above, and will not be repeated here. No repeated description is provided herein.

Specifically, the second transmission assembly includes a driving member, a driving wheel, a driven wheel, and pulleys. The transfer mechanisms 417 are connected to the pulleys at intervals. The driving wheel and the driven wheel are connected through the pulleys. The pulleys can be arranged in a racetrack shape to rotate around the third supporting frame 416, so as to drive the transfer mechanisms 417 to rotate around the third supporting frame 416. The driving wheel is connected to the driving member, and the driving member drives the pulleys to rotate through the driving wheel, so as to deliver the logistics crates 200 to the lower part of the third supporting frame 416.

Figure 13:
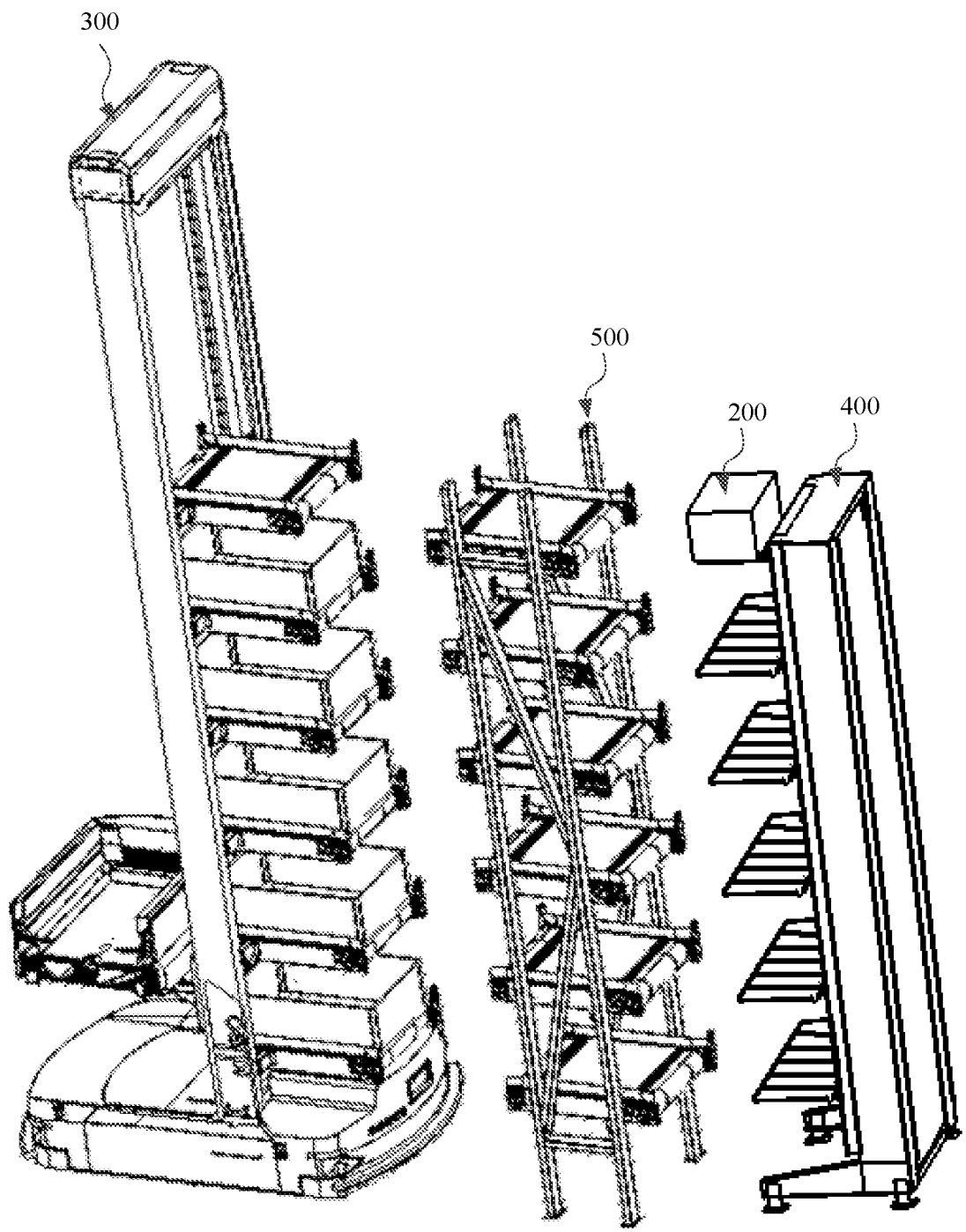
FIG. 13 is a second schematic structural diagram of a sorting system according to an embodiment of this application.

The transfer mechanism 417 may be the transfer device 100 provided in the foregoing embodiments, or the transfer mechanism 417 may be a toothed supporting structure shown in FIG. 13. No limitation thereto is made in this embodiment.

Embodiment 4

Figure 14:
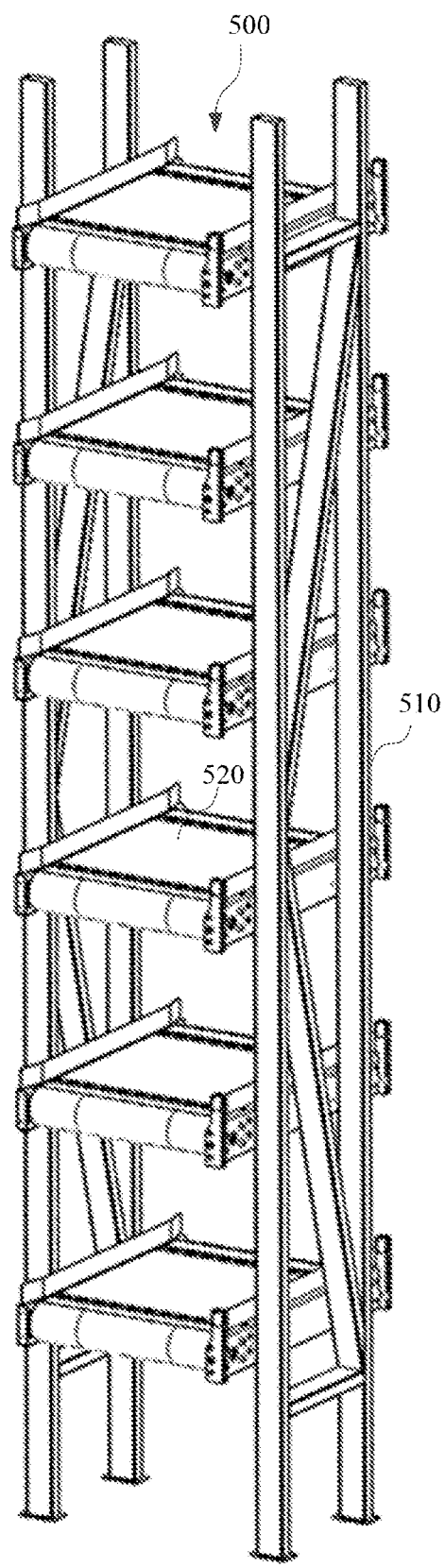
FIG. 14 is a schematic structural diagram of an unloader in FIG. 13.

FIG. 13 is a second schematic structural diagram of a sorting system according to an embodiment of this application. FIG. 14 is a schematic structural diagram of an unloader in FIG. 13. On the basis of embodiment 3 above, with reference to FIG. 13 and FIG. 14, the sorting system provided in this application further includes at least one unloader 500. The unloader 500 is configured to transport logistics crates 200 between a robot 300 and a conveyor 400. In this case, the structure of the conveyor 400 in the implementation shown in FIG. 12 described above is used.

The unloader 500 includes at least two second storage layers 520, the second storage layer 520 is disposed in a first direction of the unloader 500 (i.e., the height direction of the unloader 500), and the unloader 500 transports the logistics crate 200 between the robot 300 and the conveyor 400 through the second storage layer 520.

In a specific implementation, the unloader 500 further includes a fifth supporting frame 510, and the second storage layer 520 is located on the fifth supporting frame 510. The second storage layer 520 is supported by the fifth supporting frame 510. The fifth supporting frame 510 may be a rectangular frame, and the second storage layer 520 is located in the fifth supporting frame 510.

By providing the unloader 500, the logistics crate 200 on the robot 300 can be temporarily stored on the unloader 500, thereby reducing the unloading time of the robot 300. Thus, the robot 300 can be released, so that the robot 300 can perform other tasks, thereby further improving the operation efficiency of the robot 300. Alternatively, the logistics crate 200 on the conveyor 400 is transported to the robot 300 through the unloader 500.

In order to timely move the logistics crate 200 on the robot 300 to the unloader 500, in some embodiments, the second storage layer 520 is in one-to-one correspondence to the transfer device 100 on the robot 300. The second storage layer 520 is configured to transfer the logistics crate 200 on the transfer devices 100 of the robot 300 to the conveyor 400 at a same time. The transfer mechanism 417 may be in one-to-one correspondence to the second storage layer 520. The logistics crate 200 is transported to the transfer device 100 of the robot 300 sequentially through the transfer mechanism 417 and the second storage layer 520 at a same time.

In order to facilitate transfer of the logistics crate 200 on the unloader 500 to the conveyor 400, or to the robot 300, the second storage layer 520 may be the transfer device 100 provided in the foregoing embodiments.

Embodiment 5

Figure 15:
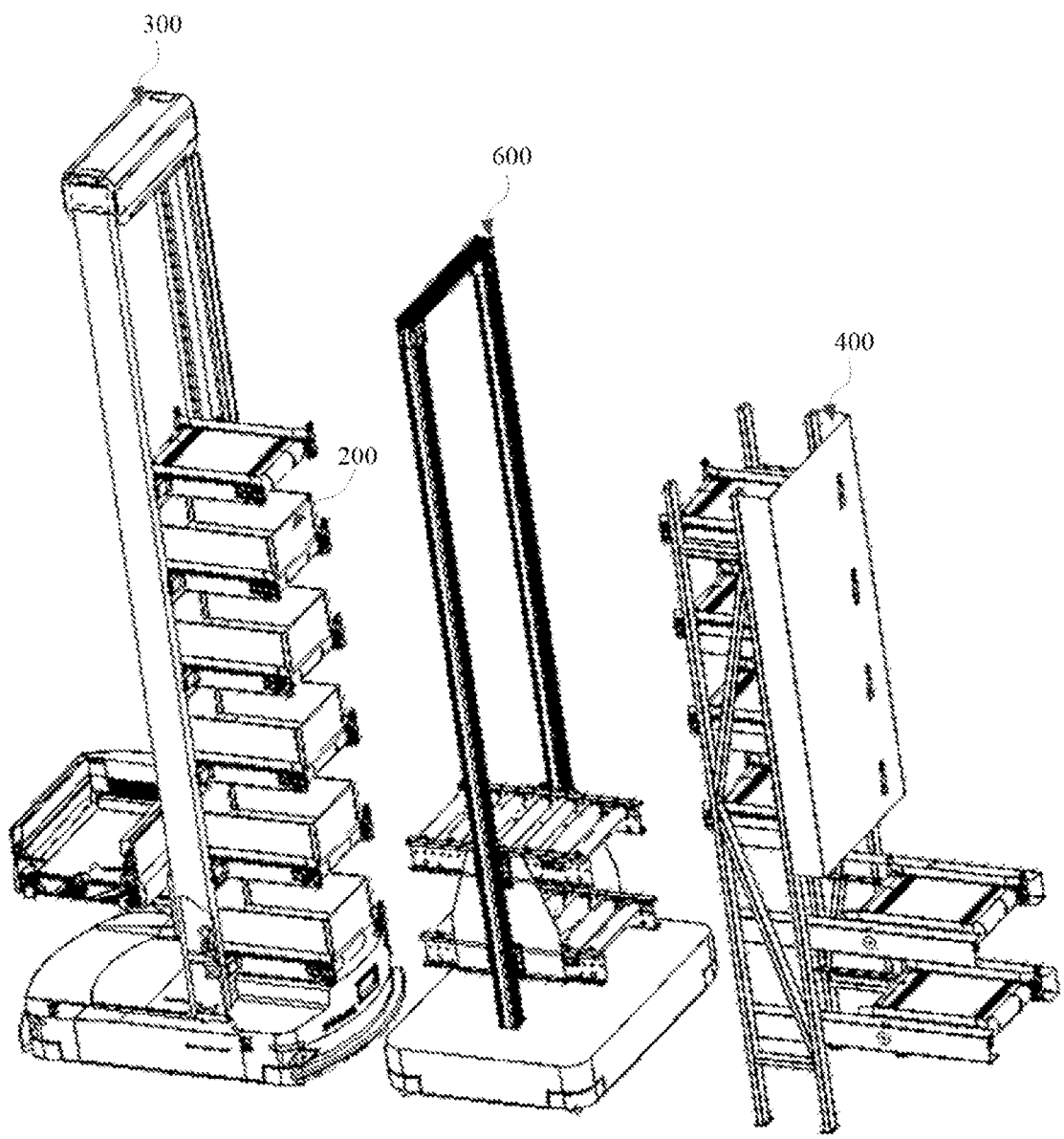
FIG. 15 is a third schematic structural diagram of a sorting system according to an embodiment of this application.
Figure 16:
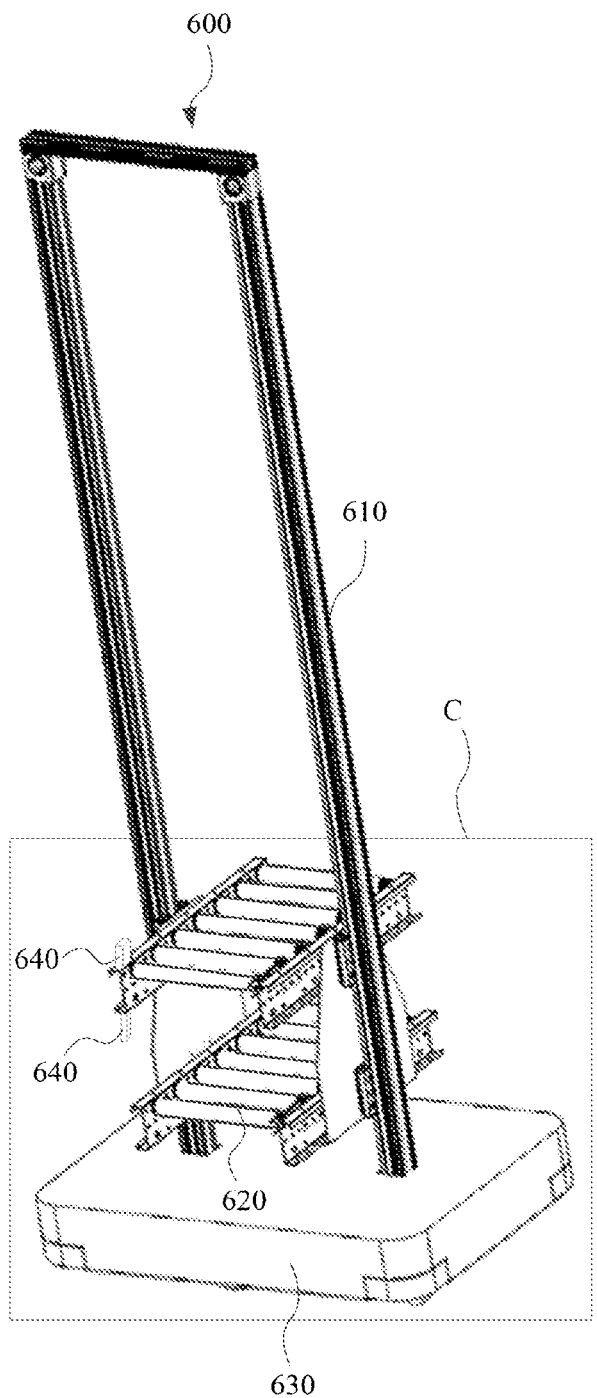
FIG. 16 is a schematic structural diagram of an elevator in FIG. 15.
Figure 17:
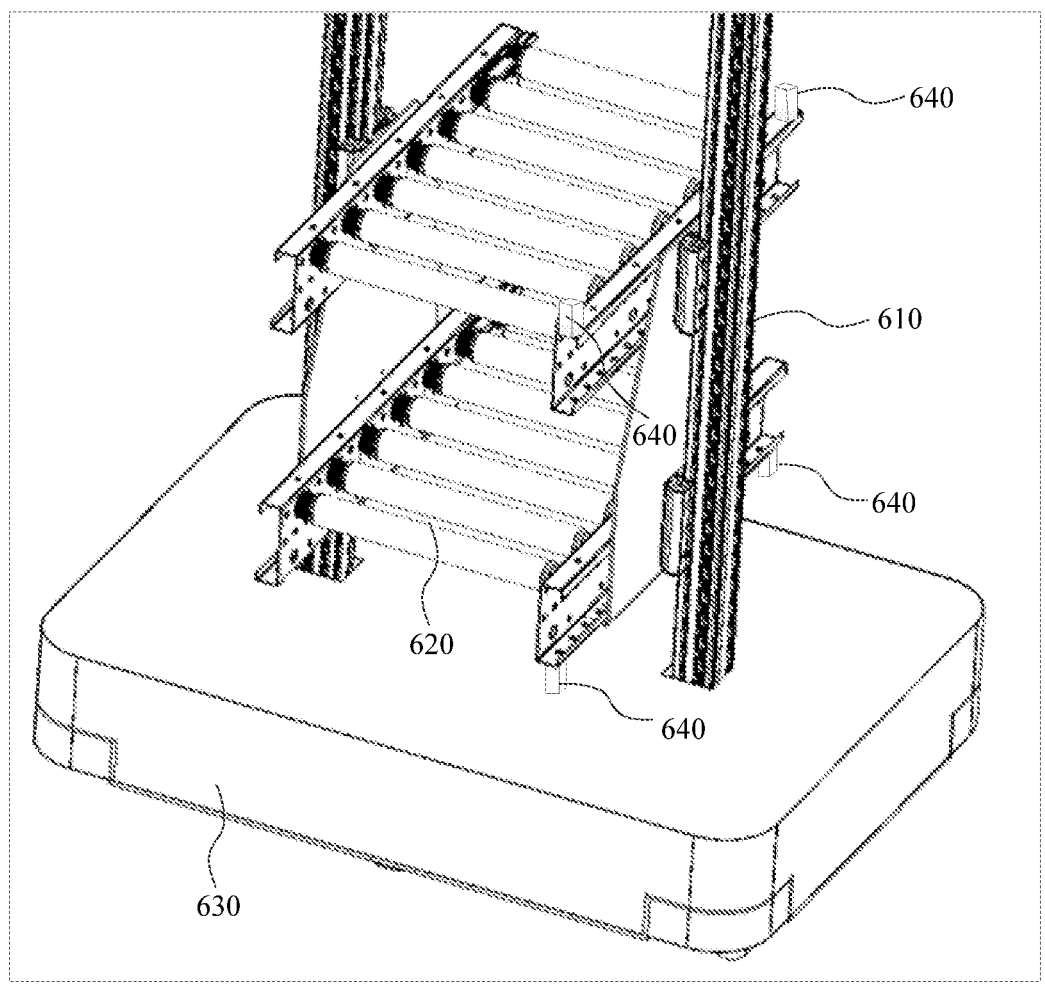
FIG. 17 is a partial enlarged view of part C in FIG. 16.
Figure 18:
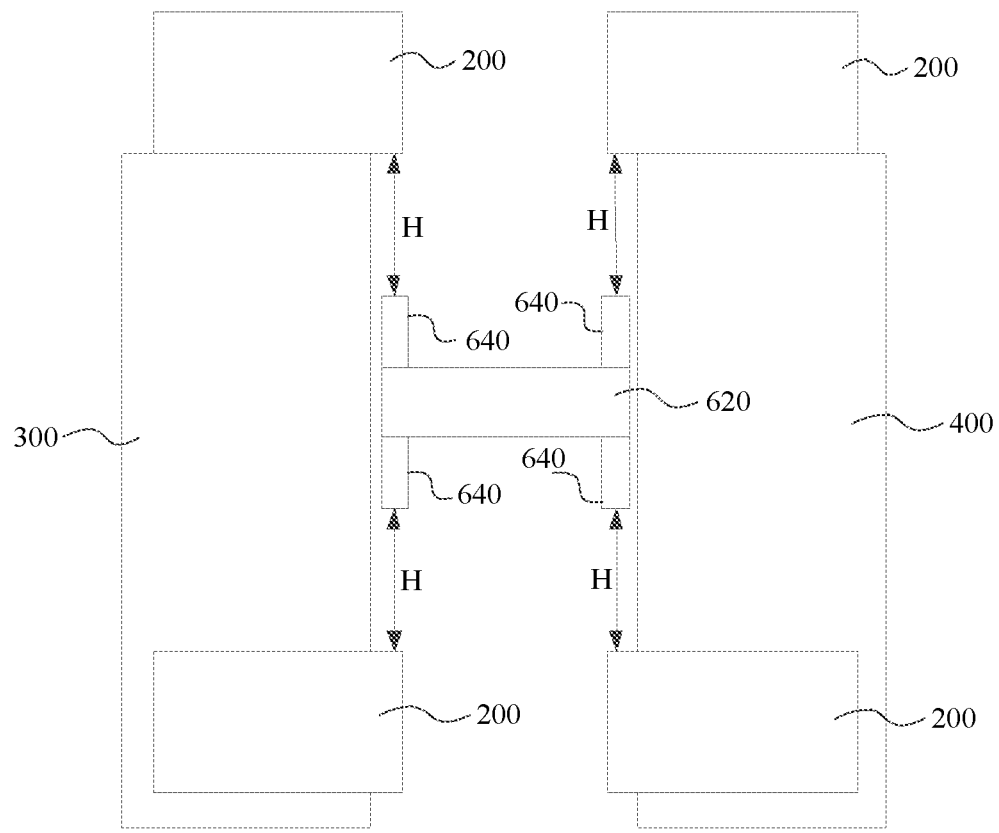
FIG. 18 is a use state diagram of a second detection assembly in FIG. 15.

FIG. 15 is a third schematic structural diagram of a sorting system according to an embodiment of this application. FIG. 16 is a schematic structural diagram of an elevator in FIG. 15. FIG. 17 is a partial enlarged view of part C in FIG. 16. FIG. 18 is a use state diagram of a second detection assembly in FIG. 15. On the basis of embodiment 3 above, with reference to FIG. 15 to FIG. 18, the sorting system further includes at least one elevator 600. The elevator 600 is configured to transport a logistic crates 200 between a robot 300 and a conveyor 400. Specifically, the elevator 600 receives the logistics crate 200 on the robot 300 and transports the logistics crate 200 to the conveyor 400, or the elevator 600 receives the logistics crate 200 on the conveyor 400 and transports the logistics crate 200 to the robot 300.

The elevator 600 includes a fourth supporting frame 610 and at least two third storage layers 620. The third storage layer 620 is disposed in a first direction of the fourth supporting frame 610 (i.e., the height direction of the fourth supporting frame 610), and the third storage layer 620 can move in the first direction of the fourth supporting frame 610 (i.e., moving up and down in the height direction of the fourth supporting frame 610). The third storage layer 620 is used for placing the logistics crate 200. In a specific implementation, the elevator 600 may be provided with a timing belt assembly or a chain assembly, and the third storage layer 620 is driven to move in the first direction of the fourth supporting frame 610 by the timing belt assembly or the chain assembly. The third storage layer 620 may be the transfer device 100 provided in the foregoing embodiments.

When the conveyor 400 has the structure shown in FIG. 12, the elevator 600 may be omitted, and the sorting system may include the robot 300 and the conveyor 400.

In order to facilitate movement of the elevator 600 between the robot 300 and the conveyor 400, the elevator 600 further includes a second mobile chassis 630. The fourth supporting frame 610 is located on the second mobile chassis 630, and the second mobile chassis 630 is configured to drive the elevator 600 to move.

In this application, the third storage layer 620 can move up and down in the height direction of the fourth supporting frame 610, that is, the third storage layer 620 can be lifted and lowered cyclically. By the cyclic lifting and lowering of the third storage layer 620 of the elevator 600, the sorted logistics crate 200 on the first storage layer 411 at the lower part of the conveyor 400 can be transported to the robot 300, or transported to the first storage layer 411 at the upper part of the conveyor 400 for temporary storage. By the cyclic lifting and lowering of the third storage layer 620 of the elevator 600, the logistics crate 200 that is not sorted at the upper part of the conveyor 400 can also be transported to the first storage layer 411 at the lower part of the conveyor 400 for sorting.

In some embodiments, the elevator 600 further includes a second controller (not shown) and at least one second detection assembly 640. The second detection assembly 640 is electrically connected to the second controller. The second detection assembly 640 is configured to detect a distance H between the third storage layer 620 and an object at a side of the elevator 600. The second controller is configured to control, in a case that the distance H is less than or equal to a preset value, the third storage layer 620 to stop moving in the first direction.

The object at the side of the elevator 600 may be a logistics crate 200 at an unsafe position on the robot 300 and/or a logistics crate 200 at an unsafe position on the conveyor 400 shown in FIG. 18.

In this application, a detection surface of the second detection assembly 640 faces a first end in the first direction and a second end in a second direction, respectively. When there is one third storage layer 620, at least one second detection assembly 640 may be connected to each of the upper surface and the lower surface of the third storage layer 620. When there are two or more third storage layers 620, at least one second detection assembly 640 may be connected to each of the upper surface of the third storage layer 620 at the first end in the first direction (the uppermost third storage layer 620 in FIG. 18) and the lower surface of the third storage layer 620 at the second end in the first direction (the lowermost third storage layer 620 in FIG. 18). The second detection assembly 640 detects whether the third storage layer 620 will collide with the logistics crate 200 at the unsafe position on the robot 300 and/or the logistics crate 200 at the unsafe position on the conveyor 400 during the upward/downward movement of the third storage layer 620 in the height direction of the fourth supporting frame 610.

The preset value is a safety distance between the third storage layer 620 and the logistics crate 200 located at the unsafe position on the robot 300 and/or the logistics crate 200 located at the unsafe position on the conveyor 400. That is, when the distance is less than or equal to the safety distance, the third storage layer 620 is controlled to stop moving up/down to prevent the third storage layer 620 from colliding with the logistics crate 200 at the unsafe position on the robot 300 and/or the logistics crate 200 at the unsafe position on the conveyor 400.

The sorting system may include a master controller to which the first and second controllers are connected. In this application, when the distance H is less than or equal to the preset value, the second controller controls the third storage layer 620 to stop moving in the first direction, and the first controller controls the transfer device 100 to transmit the logistics crate 200 in the second direction or the third direction, so as to move the logistics crate 200 to a safe position. In this case, the second controller 640 controls the third storage layer 620 to move in the first direction.

In some embodiments, the angle of the second detection assembly 640 is adjustable. By adjusting the angle of the second detection assembly 640, the detection surface of the second detection assembly 640 can detect the logistics crate 200 at the unsafe position and/or the logistics crate 200 at the unsafe position on the conveyor 400. An angle adjustment structure commonly used by a person skilled in the art may be adopted, which is not limited in this embodiment.

The second detection assembly 640 may be a gap sensor.

In this application, since the elevator 600 includes the second mobile chassis 630, the second mobile chassis 630 can drive the elevator 600 to move, so that the elevator 600 moves between the conveyor 400 and the robot 300 to transport the logistics crates 200. That is, one elevator 600 may correspond to at least one conveyor 400 and at least one robot 300. In this way, the number of the elevator 600 may be less than or equal to the number of the conveyor 400.

Embodiment 6

Figure 19:
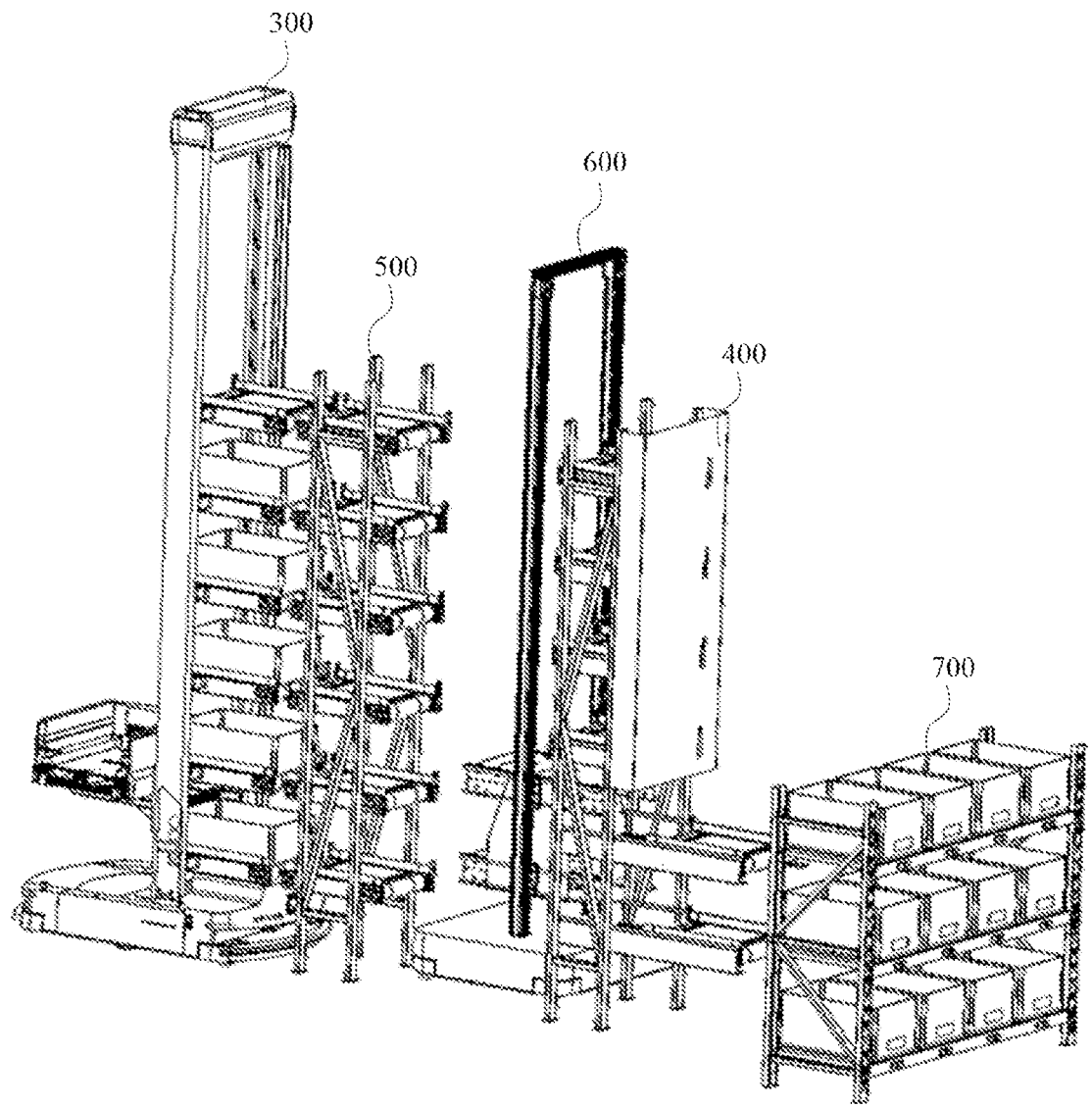
FIG. 19 is a fourth schematic structural diagram of a sorting system according to an embodiment of this application.
Figure 20:
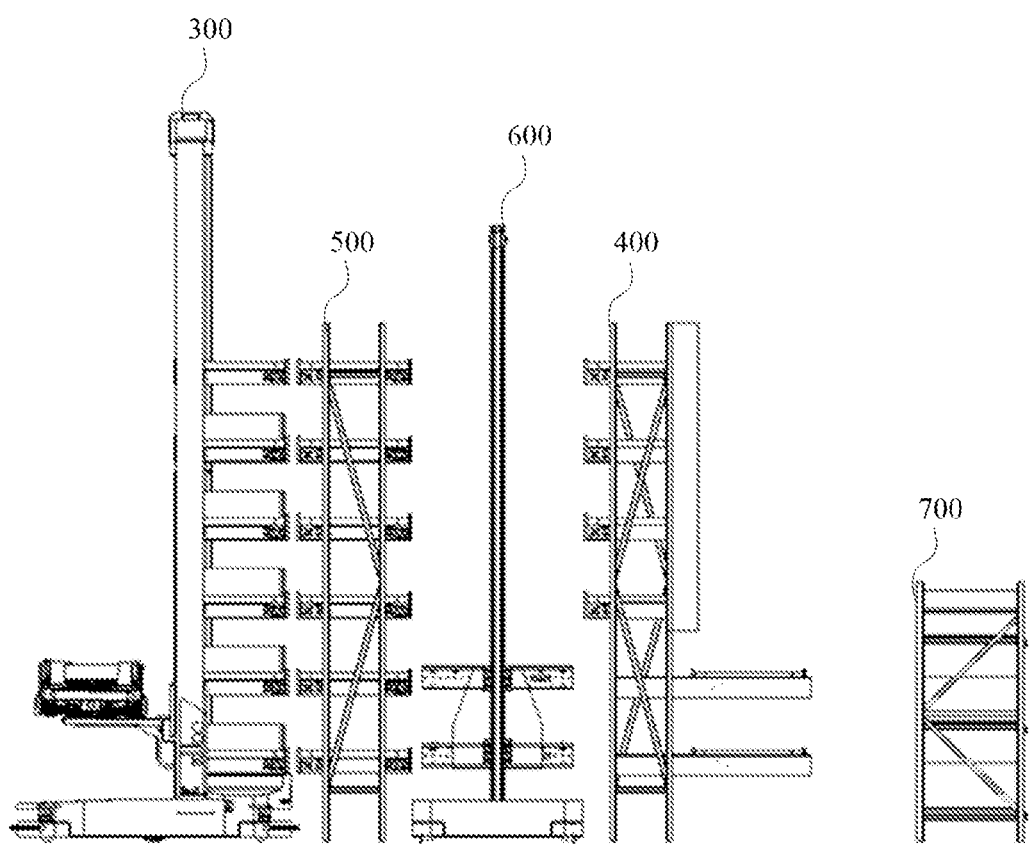
FIG. 20 is a side view of FIG. 19.
Figure 21:
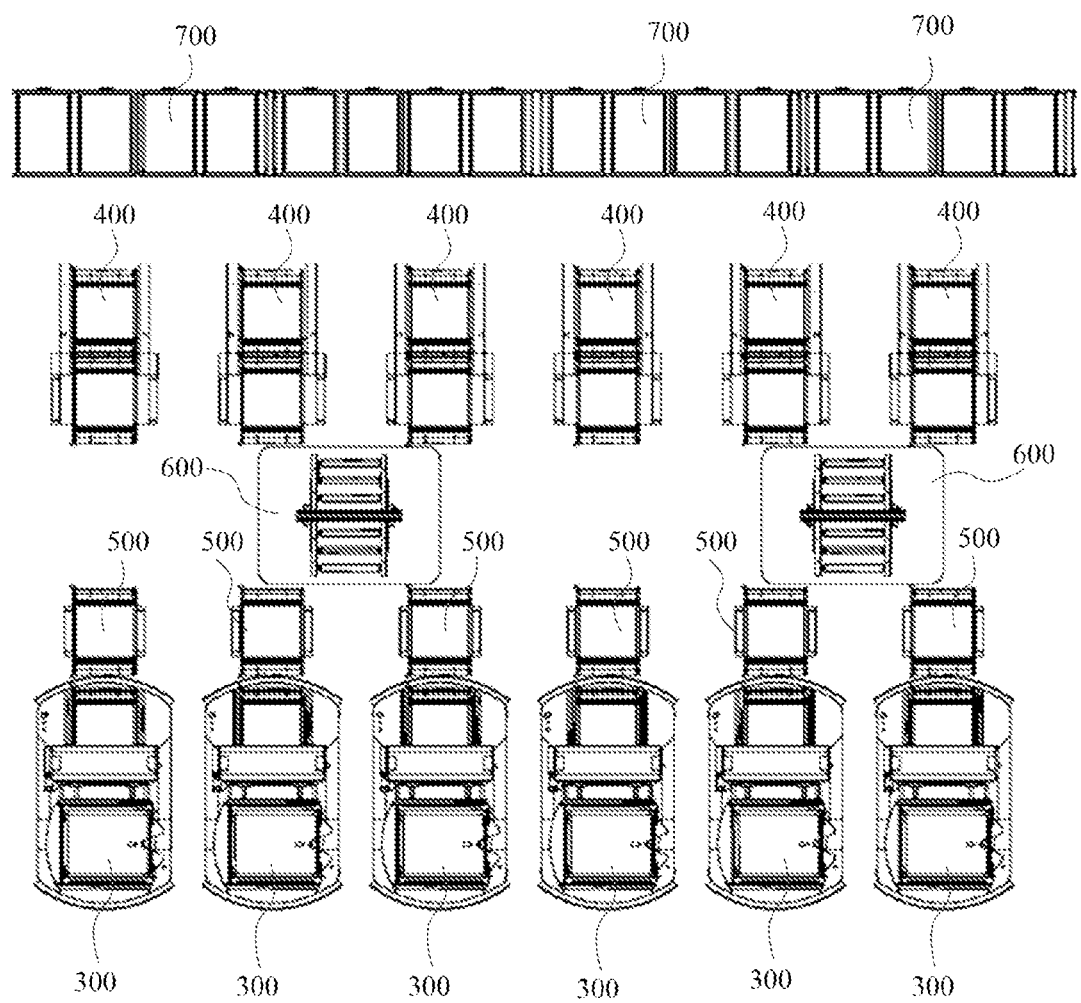
FIG. 21 is a top view of FIG. 19.

FIG. 19 is a fourth schematic structural diagram of a sorting system according to an embodiment of this application. FIG. 20 is a side view of FIG. 19. FIG. 21 is a top view of FIG. 19. On the basis of embodiment 4 above, with reference to FIG. 19 to FIG. 21, the sorting system further includes at least one elevator 600. That is, the sorting system includes a robot 300, an unloader 500, the elevator 600, and a conveyor 400. The elevator 600 is configured to transfer a logistics crate between the unloader 500 and the conveyor 400.

In this application, the structure and working principle of the elevator 600 are the same as those in an embodiment 5, and no repeated description is provided herein.

In this application, after the unloader 500 receives the logistics crate 200 on the robot 300, the elevator 600 receives the logistics crate 200 on the unloader 500 and transports the logistics crate 200 to the conveyor 400. Alternatively, the elevator 600 receives the logistics crate 200 on the conveyor 400 and transports the logistics crate 200 to the unloader 500, and the unloader 500 transports the logistics crate 200 to the robot 300.

An object at a side of the elevator 600 may be at least one of a logistics crate 200 at an unsafe position on the unloader 500 or a logistics crate 200 at an unsafe position on the conveyor 400. The second detection assembly 640 detects whether the third storage layer 620 will collide with the logistics crate 200 at the unsafe position on the unloader 500 or the logistics crate 200 at the unsafe position on the conveyor 400 during upward/downward movement of the third storage layer 620 in the height direction of the fourth supporting frame 610. The detection mode of the second detection assembly 640 is the same as that in an embodiment 5, and no repeated description is provided herein.

Figure 22:
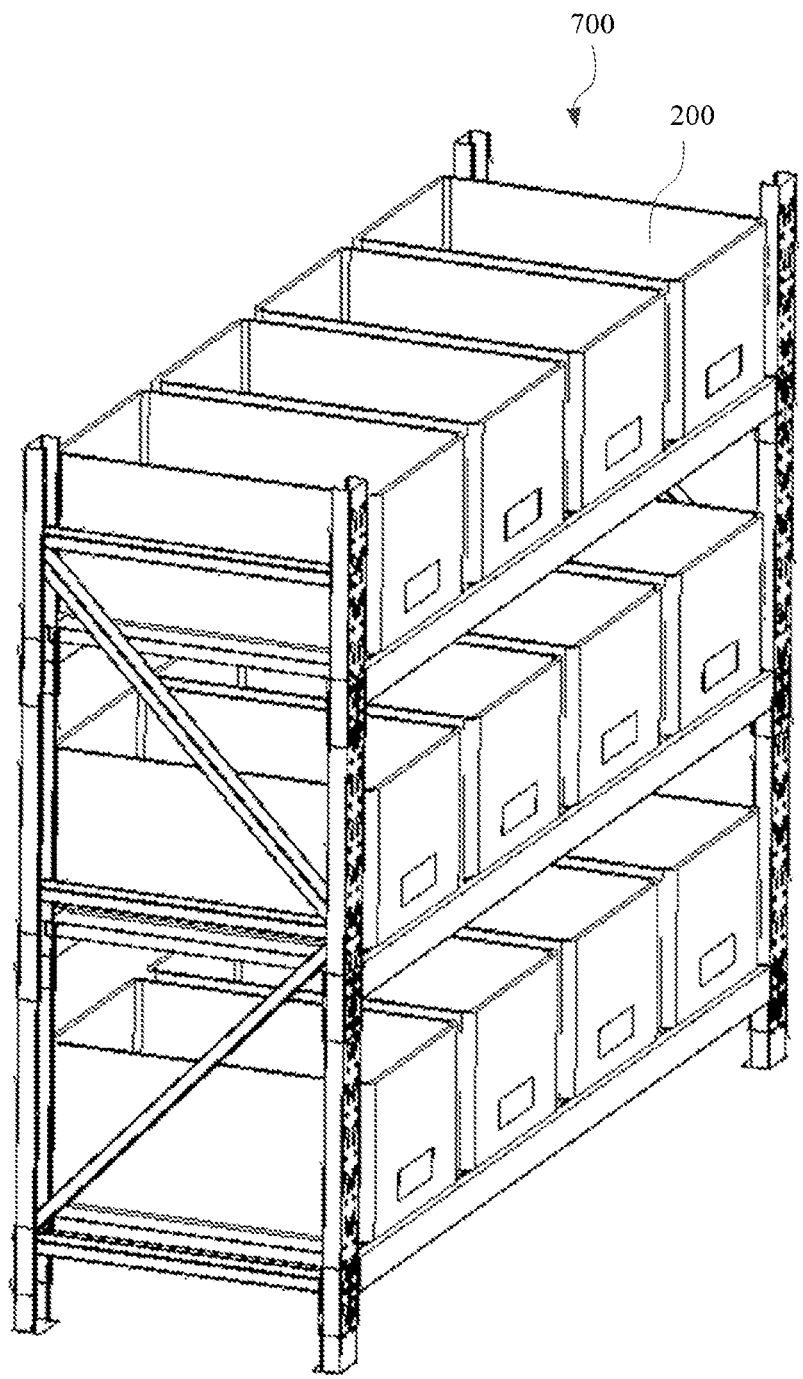
FIG. 22 is a schematic structural diagram of a rack in FIG. 20.

FIG. 22 is a schematic structural diagram of a rack in FIG. 20. With reference to FIG. 20 and FIG. 22, the sorting system provided in this application further includes at least one rack 700 and/or a goods transport assembly. The rack 700 is used for storing the logistics crate 200 in the conveyor 400. The rack 700 is used for placing the logistics crate 200. The goods transport assembly is configured to transport the logistics crate 200 in the conveyor 400.

At least one of embodiment 3 to embodiment 5 above may include at least one rack 700 and/or a goods transport assembly.

The number of the robot 300, the number of the unloader 500, and the number of the conveyor 400 may be the same. In FIG. 21, description is made by taking the number of the robot 300 being six and the number of the elevator 600 being two as an example. In some embodiments, the number of the robot 300 is less than the number of the unloader 500, thereby ensuring that the robot 300 can timely transport the logistics crate 200 thereon to the unloader 500 to avoid occupation of the robot 300. The number of the unloader 500 may be the same as the number of the conveyor 400.

In the sorting system provided in this application, the elevator 600 and the robot 300 can move independently, and the robot 300, the unloader 500, the elevator 600, and the conveyor 400 cooperate with each other, so that an operator can conveniently sort goods. Moreover, the difficulty in an implementation and deployment is reduced, the workload of deploying and handling the sorting system is reduced, and the cost is reduced.

The sorting system provided by the foregoing embodiments has the following advantages:

1. The conveyor 400 is provided between the robot 300 and the operator, thereby improving the safety of the operator during work, since the operator does not directly perform an operation on the robot 300. The first storage layer 411 at the lower part of the conveyor 400 can actively extend out of the second supporting frame 410, so that the operator does not need to climb up when sorting goods, thereby improving the friendliness in operation.
2. The first storage layer 411 at the lower part of the conveyor 400 can extend out of the second supporting frame 410, making it convenient for the operator to sort goods in the logistics crate 200. Friendly human-computer interaction is achieved, and the operator can stand to work at a comfortable height that can be reached.
3. By providing the unloader 500 and the conveyor 400, the robot 300 can transport the logistics crate 200 thereon to the unloader 500 or the conveyor 400 at a same time, thereby improving the work efficiency of the robot 300. The robot 300 can unload the logistics crate 200 to the unloader 500 or the conveyor 400 or transport the logistics crate 200 on the unloader 500 or the conveyor 400 to the robot 300 at a same time. The robot 300 will not be occupied for a long time due to slow manual operation, thereby increasing the actual effective working time of the robot 300 and improving the efficiency.
4. By providing the movable elevator 600, one elevator 600 can correspond to multiple unloaders 500 or conveyors 400, and complete transportation of goods through cyclic lifting/lowering, making full use of the performance of the elevator 600 and reducing the overall cost.
5. The sorting system may include the robot 300, the unloader 500, the elevator 600, and the conveyor 400 which are independently designed, and the four different sorting systems in an embodiment 3 to an embodiment 6 can be selected according to the size of the warehouse and needs for the efficiency of warehouse logistics. The sorting system is made flexible and modular, and each part can be moved and assembled independently, reducing the difficulty in an implementation and deployment, the workload of migration, and the cost. The sorting system is suitable for leased warehouses, or warehouses that require dynamic changes to operation processes.

Embodiment 7

Figure 23:
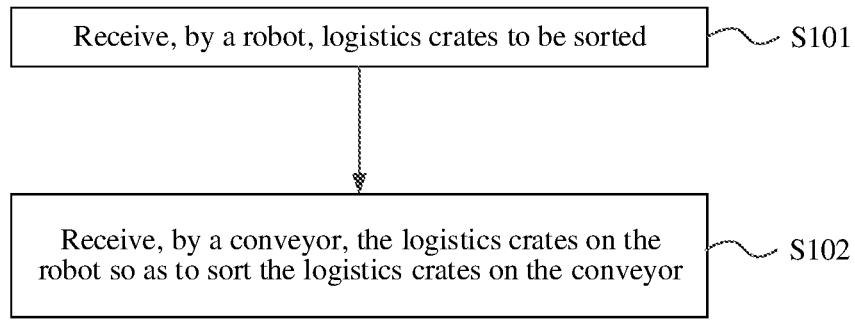
FIG. 23 is a first flowchart of a sorting method according to an embodiment of this application.

FIG. 23 is a first flowchart of a sorting method according to an embodiment of this application. With reference to FIG. 23, this application further provides a sorting method, using the sorting system provided in an embodiment 3 above. The sorting method includes the following steps:

S101: Receive, by the robot, a logistics crate to be sorted.

Specifically, the logistics crates 200 are placed one by one into the multiple transfer devices 100 provided on the robot 300 through the fork 313 on the robot 300. At least one logistics crate 200 can be placed in each of the transfer devices 100, and at least one piece of goods is placed in each of the logistics crates 200. The logistics crates 200 placed on each of the transfer devices 100 of the robot 300 may be the same or different.

S102: Receive, by the conveyor, the logistics crate on the robot so as to sort the logistics crate on the conveyor.

Specifically, the first storage layer 411 on the conveyor 400 may be provided in one-to-one correspondence to the transfer device 100 on the robot 300. The first storage layer 411 receives the logistics crate 200 on the robot 300. The operator pulls out the first storage layer 411 at the lower part of the conveyor 400, or the first storage layer 411 automatically extends out of the lower part of the conveyor 400, or the transfer mechanism 417 rotates to the lower part of the conveyor 400, and the operator sorts goods in the logistics crate 200 on the first storage layer 411 or the transfer mechanism 417 to deliver the goods to the rack 700 or the goods transport assembly. In this way, direct contact between the operator and the robot 300 is avoided, the unloading speed of the robot 300 is increased, the unloading time of the robot 300 is reduced, and the work efficiency of the robot 300 is improved.

Optionally, after S102, the sorting method provided in this application further includes: transporting, by the conveyor 400, the logistics crate 200 to the robot 300. That is, the conveyor 400 can transport a new logistics crate 200 or a sorted logistics crate 200 thereon to the robot 300, so that the robot 300 transports the new logistics crate 200 or the sorted logistics crate 200 to a warehouse.

Embodiment 8

Figure 24:
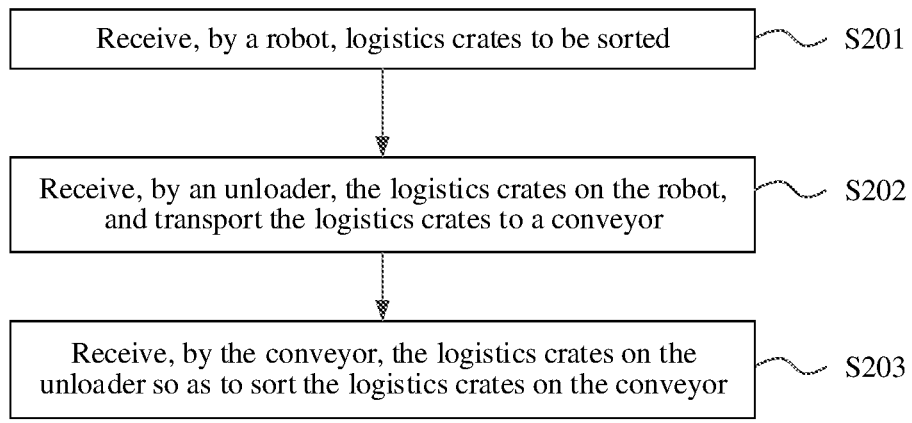
FIG. 24 is a second flowchart of a sorting method according to an embodiment of this application.

FIG. 24 is a second flowchart of a sorting method according to an embodiment of this application. With reference to FIG. 24, this application further provides a sorting method, using the sorting system provided in an embodiment 4 above. The sorting method includes the following steps:

S201: Receive, by the robot, a logistics crate to be sorted.

S202: Receive, by the unloader, the logistics crate on the robot, and transport the logistics crate to the conveyor.

Specifically, the second storage layer 520 on the unloader 500 is in one-to-one correspondence to the transfer device 100 on the robot 300, the transfer device 100 on the robot 300 is used for placing the logistics crate 200, and the second storage layer 520 on the unloader 500 receive the logistics crate 200 in the robot 300 and transports the logistics crate 200 to the transfer mechanisms 417 on the conveyor 400.

S203: Receive, by the conveyor, the logistics crate on the unloader so as to sort the logistics crate on the conveyor.

Specifically, the transfer mechanisms 417 on the conveyor 400 receive the logistics crate 200 on the unloader 500, and the operator sorts goods in the logistics crate 200 on the transfer mechanisms 417 to deliver the goods to the rack 700 or the goods transport assembly.

Optionally, after S203, the sorting method provided in this application further includes: transporting, by the conveyor 400, the logistics crate 200 to the robot 300 through the unloader 500. That is, the conveyor 400 can transport a new logistics crate 200 or a sorted logistics crate 200 thereon to the unloader 500, and the unloader 500 transports the new logistics crate 200 or the sorted logistics crate 200 to the robot 300, so that the robot 300 transports the new logistics crate 200 or the sorted logistics crate 200 to a warehouse.

Embodiment 9

Figure 25:
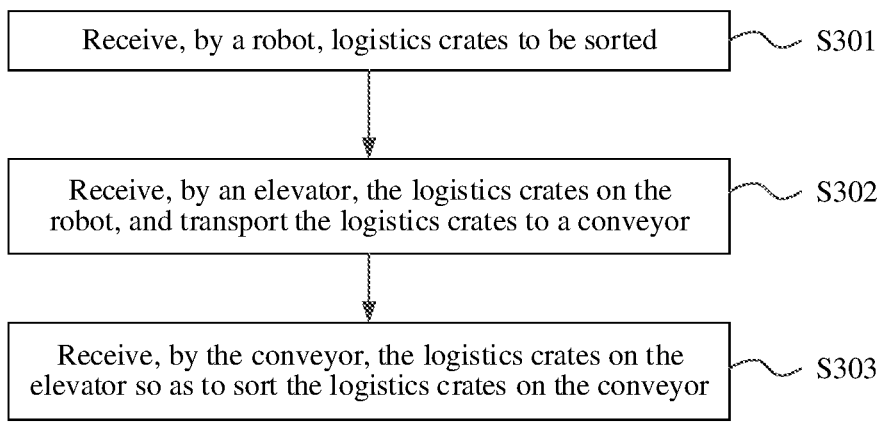
FIG. 25 is a third flowchart of a sorting method according to an embodiment of this application.

FIG. 25 is a third flowchart of a sorting method according to an embodiment of this application. With reference to FIG. 25, this application further provides a sorting method, using the sorting system provided in an embodiment 5 above. The sorting method includes the following steps:

S301: Receive, by the robot, a logistics crate to be sorted.

S302: Receive, by the elevator, the logistics crate on the robot, and transport the logistics crate to the conveyor.

Specifically, the elevator 600 moves to the robot 300, and the third storage layer 620 on the elevator 600 receives the logistics crate 200 placed on the transfer device 100 on the robot 300 and transport the logistics crate 200 to the first storage layer 411 on the conveyor 400.

S303: Receive, by the conveyor, the logistics crate on the elevator so as to sort the logistics crate on the conveyor.

Specifically, the first storage layer 411 on the conveyor 400 receives the logistics crate 200 placed on the third storage layers 620 on the elevator 600, and the operator sorts goods in the logistics crate 200 on the first storage layer 411 to deliver the goods to the rack 700 or the goods transport assembly.

After the logistics crate 200 is sorted, the sorted logistics crate 200 on the first storage layer 411 at the lower part of the conveyor 400 can be transported to the robot 300, or transported to the first storage layer 411 at the upper part of the conveyor 400 for temporary storage. By the cyclic lifting and lowering of the third storage layer 620 of the elevator 600, the logistics crate 200 that is not sorted at the upper part of the conveyor 400 can also be transported to the first storage layer 411 at the lower part of the conveyor 400 for sorting. Optionally, after S303, the sorting method provided in this application further includes: transporting, by the conveyor 400, the logistics crate 200 to the robot 300 through the elevator 600. That is, the conveyor 400 can transport a new logistics crate 200 or a sorted logistics crate 200 thereon to the elevator 600, and the elevator 600 transports the new logistics crate 200 or the sorted logistics crate 200 to the robot 300, so that the robot 300 transports the new logistics crate 200 or the sorted logistics crate 200 to a warehouse.

Embodiment 10

Figure 26:
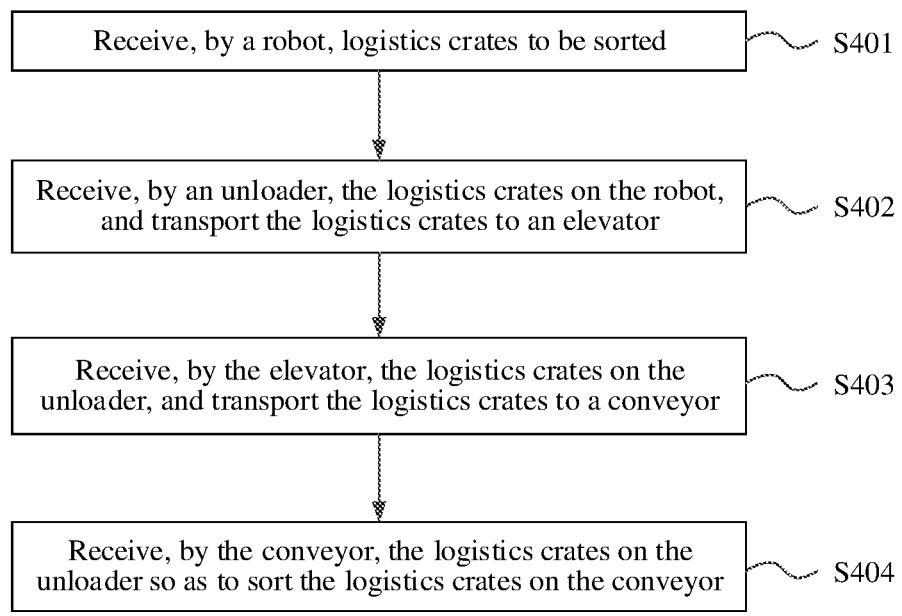
FIG. 26 is a fourth flowchart of a sorting method according to an embodiment of this application.

FIG. 26 is a fourth flowchart of a sorting method according to an embodiment of this application. With reference to FIG. 26, this application further provides a sorting method, using the sorting system provided in an embodiment 5 above. The sorting method includes the following steps:

S401: Receive, by the robot, a logistics crate to be sorted.

Specifically, the robot 300 receives an instruction for picking up at least one logistics crate 200 to be sorted, and puts the logistics crate 200 one by one into the transfer devices 100 provided on the robot 300 through the fork 313 on the robot 300. An identifier used for identifying the goods in the logistics crate 200, such as a QR code, can be attached to the logistics crate 200.

S402: Receive, by the unloader, the logistics crate on the robot, and transport the logistics crate to the elevator.

Specifically, the second storage layer 520 on the unloader 500 is in one-to-one correspondence to the transfer device 100 on the robot 300, the transfer device 100 on the robot 300 is used for placing the logistics crate 200, and the second storage layer 520 on the unloader 500 receives the logistics crate 200 in the robot 300 and transports the logistics crate 200 to the elevator 600.

S403: Receive, by the elevator, the logistics crate on the unloader, and transport the logistics crate to the conveyor.

Specifically, the third storage layer 620 in the elevator 600 receives the logistics crate 200 on the second storage layer 520 on the unloader 500. The elevator 600 moves to the position of the conveyor 400 and transports the logistics crate 200 to the transfer mechanisms 417 or the first storage layers 411 on the conveyor 400.

S404: Receive, by the conveyor, the logistics crate on the unloader so as to sort the logistics crate on the conveyor.

Specifically, the transfer mechanism 417 or the first storage layer 411 on the conveyor 400 receives the logistics crate 200 placed on the third storage layer 620 on the elevator 600, and the operator sorts goods in the logistics crate 200 on the first storage layer 411 or the transfer mechanism 417 to deliver the goods to the rack 700 or the goods transport assembly. Exemplarily, in order to make it convenient for the operator to put sorted goods into a corresponding box 710, an indicator light is provided below the box 710, and the indicator light is used for giving a prompt about a placement position to the operator. The pattern and text of the indicator light can be matched with the goods. After sorting the goods, the operator can also place the goods on the goods transport assembly, such as a conveyor line and other transport assemblies. The operator places the logistics crate 200 on the conveyor line, and other equipment or operators classify same, thereby further improving the sorting efficiency.

If at least two pieces of goods are placed in the logistics crate 200, the same operator may place the goods in corresponding different boxes 710 in the rack 700, or different operators place the goods in corresponding different boxes 710 in the rack 700.

Each box 710 may correspond to a different order, and each box 710 may contain at least one piece of goods. Through the above-mentioned sorting method, the goods can be placed in the boxes 710 corresponding to the same orders.

After the logistics crate 200 is sorted, the sorted logistics crate 200 on the first storage layer 411 at the lower part of the conveyor 400 can be transported to the unloader 500, or transported to the first storage layer 411 at the upper part of the conveyor 400 for temporary storage. By the cyclic lifting and lowering of the third storage layer 620 of the elevator 600, the logistics crate 200 that is not sorted at the upper part of the conveyor 400 can also be transported to the first storage layer 411 at the lower part of the conveyor 400 for sorting.

Optionally, after S403, the sorting method provided in this application further includes: transporting, by the conveyor, the logistics crate to the robot sequentially through the elevator and the unloader. That is, the conveyor 400 can transport a new logistics crate 200 or a sorted logistics crate 200 thereon to the elevator 600, the elevator 600 transports the new logistics crate 200 or the sorted logistics crate 200 to the unloader 500, and the unloader 500 transports the new logistics crate 200 or the sorted logistics crate 200 to the robot 300, so that the robot 300 transports the new logistics crate 200 or the sorted logistics crate 200 to a warehouse.

Finally, the foregoing embodiments are merely used for describing the technical solutions of this application, rather than limiting this application. Although this application is described in detail with reference to the foregoing embodiments, a person of ordinary skill in the art is to understand that they can still make modifications to the technical solutions described in the foregoing embodiments or make equivalent replacements on some or all of technical features therein. These modifications or replacements do not cause the essence of the corresponding technical solutions to depart from the scope of the technical solutions of the embodiments of this application.

What is claimed is:

1. A sorting system, comprising at least one conveyor, at least one robot, and at least one elevator, wherein the conveyor is configured to receive a logistics crate on the robot or transport a logistics crate to the robot;
    wherein the robot comprises a body and at least two transfer devices provided on the body;
    wherein the transfer device is disposed in a first direction of the body; and the transfer device comprises a supporting base and a first transmission assembly, the first transmission assembly is located on the supporting base, and the first transmission assembly is configured to transport the logistics crate;
    wherein the elevator is configured to transport the logistics crate between the robot and the conveyor.

2. The sorting system according to claim 1, wherein the conveyor comprises a second supporting frame and at least two first storage layers, the first storage layer is disposed in a first direction of the second supporting frame, and the first storage layer is configured to receive the logistics crate on the robot or transport the logistics crate to the robot.

3. The sorting system according to claim 2, wherein the first storage layer is movable between a first position and a second position, the first position is on the second supporting frame, and the second position is at a side of the second supporting frame facing away from the robot.

4. The sorting system according to claim 2, wherein a blocking member is provided on the second supporting frame, the blocking member is located at the side of the second supporting frame facing away from the robot, and the blocking member is configured to block at least one of the first storage layers located at an upper part of the second supporting frame.

5. The sorting system according to claim 2, wherein each of the first storage layers is a transfer device.

6. The sorting system according to claim 1, wherein the conveyor comprises a third supporting frame, a second transmission assembly located on the third supporting frame, and at least one transfer mechanism; and
    the transfer mechanism is configured to receive the logistics crate, the second transmission assembly is connected to the transfer mechanism, and the second transmission assembly drives the transfer mechanism to rotate around the third supporting frame, so as to deliver the logistics crate to a lower part of the third supporting frame.

7. The sorting system according to claim 1, further comprising at least one unloader, wherein the unloader is configured to transport the logistics crate between the robot and the conveyor, wherein the unloader comprises at least two second storage layers, the second storage layer is disposed in the first direction of the unloader, and the unloader transports the logistics crate between the robot and the conveyor through the second storage layer.

8. The sorting system according to claim 7, wherein each of the second storage layers is a transfer device.

9. The sorting system according to claim 7, wherein the elevator is configured to transport the logistics crate between the unloader and the conveyor.

10. The sorting system according to claim 7, wherein the elevator comprises a fourth supporting frame and at least one third storage layer, the third storage layer is disposed in the first direction of the fourth supporting frame and is movable in the first direction of the fourth supporting frame, and the third storage layer is configured to transport the logistics crate.

11. The sorting system according to claim 10, wherein the elevator further comprises a second mobile chassis, the fourth supporting frame is located on the second mobile chassis, and the second mobile chassis is configured to drive the elevator to move.

12. The sorting system according to claim 11, wherein the elevator further comprises a second controller and at least one second detection assembly, the second detection assembly is electrically connected to the second controller, the second detection assembly is configured to detect a distance between the third storage layer and an object at a side of the elevator, and the second controller is configured to control, in a case that the distance is less than or equal to a preset value, the third storage layer to stop moving in the first direction.

13. The sorting system according to claim 1, wherein the number of the elevator is less than or equal to the number of the conveyor.

14. A sorting method, using a sorting system, comprising:
    receiving, by a robot or a conveyor, a logistics crate to be sorted; and
    transporting, by the robot or the conveyor, the logistics crate to the conveyor or the robot so as to sort the logistics crate;
    wherein the robot comprises a body and at least two transfer devices provided on the body;
    wherein the transfer device is disposed in a first direction of the body; and the transfer device comprises a supporting base and a first transmission assembly, the first transmission assembly is located on the supporting base, and the first transmission assembly is configured to transport the logistics crate;
    wherein the transporting, by the robot or the conveyor, the logistics crate to the conveyor or the robot comprises:
    transporting, by the robot or the conveyor, the logistics crate to an elevator; and
    transporting, by the elevator, the logistics crate to the conveyor or the robot
    wherein the elevator comprises a fourth supporting frame and at least one third storage layer, the third storage layer is disposed in the first direction of the fourth supporting frame and is movable in the first direction of the fourth supporting, frame, and the third storage layer is configured to transport the logistics crate.

15. The sorting method according to claim 14, wherein the conveyor comprises a second supporting frame and at least two first storage layers, the first storage layer is disposed in a first direction of the second supporting frame, and the first storage layer is configured to receive the logistics crate on the robot or transport the logistics crate to the robot.

16. The sorting method according to claim 15, wherein the first storage layer is movable between a first position and a second position, the first position is on the second supporting frame, and the second position is at a side of the second supporting frame facing away from the robot.

17. The sorting method according to claim 14, wherein the conveyor comprises a third supporting frame, a second transmission assembly located on the third supporting frame, and at least one transfer mechanism; and the transfer mechanism is configured to receive the logistics crate, the second transmission assembly is connected to the transfer mechanism, and the second transmission assembly drives the transfer mechanism to rotate around the third supporting frame, so as to deliver the logistics crate to a lower part of the third supporting frame.

18. The sorting method according to claim 14, wherein the transporting, by the robot or the conveyor, the logistics crate to an elevator comprises:

transporting, by the robot or the conveyor, the logistics crate to an unloader; and transporting, by the uploader, the logistics crate to the elevator;

wherein the unloader comprises at least two second storage layers, the second storage layer is disposed in the first direction of the unloader, and the unloader transports the logistics crate between the robot and the conveyor through the second storage layer.

19. A sorting system, comprising at least one conveyor, and at least one robot, wherein the conveyor is configured to receive a logistics crate on the robot or transport a logistics crate to the robot;

wherein the robot comprises a body and at least two transfer devices provided on the body;

wherein the transfer device is disposed in a first direction of the body; and the transfer device comprises a supporting base and a first transmission assembly, the first transmission assembly is located on the supporting base, and the first transmission assembly is configured to transport the logistics crate;

wherein the conveyor comprises a second supporting frame and at least two first storage layers, the first storage layer is disposed in a first direction of the second supporting frame, and the first storage layer is configured to receive the logistics crate on the robot or transport the logistics crate to the robot;

wherein the first storage layer is movable between a first position and a second position, the first position is on the second supporting frame, and the second position is at a side of the second supporting frame facing away from the robot.

* * * * *